(12) United States Patent
Iovu

(10) Patent No.: US 11,207,818 B2
(45) Date of Patent: Dec. 28, 2021

(54) METHODS OF VACUUM FORMING ARTICLES OF WEAR

(71) Applicant: adidas AG, Herzogenaurach (DE)

(72) Inventor: Tiberiu Iovu, Vancouver, WA (US)

(73) Assignee: adidas AG, Herzogenaurach (DE)

( * ) Notice: Subject to any disclaimer, the term of this patent is extended or adjusted under 35 U.S.C. 154(b) by 644 days.

(21) Appl. No.: 15/699,461

(22) Filed: Sep. 8, 2017

(65) Prior Publication Data

US 2017/0368735 A1 Dec. 28, 2017

Related U.S. Application Data

(63) Continuation of application No. 14/540,451, filed on Nov. 13, 2014, now Pat. No. 9,789,644.

(51) Int. Cl.
| | |
|---|---|
| *B29D 35/14* | (2010.01) |
| *B29C 51/42* | (2006.01) |
| *B29L 31/48* | (2006.01) |
| *B29C 51/10* | (2006.01) |
| *A43B 23/02* | (2006.01) |
| *B32B 37/10* | (2006.01) |
| *B29C 51/00* | (2006.01) |
| *B29C 51/14* | (2006.01) |

(Continued)

(52) U.S. Cl.
CPC ............ *B29C 51/10* (2013.01); *A43B 23/029* (2013.01); *A43B 23/0235* (2013.01); *A43B 23/0255* (2013.01); *B29C 51/006* (2013.01); *B29C 51/14* (2013.01); *B29D 35/146* (2013.01); *B32B 37/1018* (2013.01); *B29C 51/425* (2013.01); *B29C 2791/006* (2013.01); *B29K 2995/0065* (2013.01); *B29K 2995/0067* (2013.01); *B29L 2009/001* (2013.01); *B29L 2031/48* (2013.01); *B29L 2031/50* (2013.01); *B29L 2031/505* (2013.01)

(58) Field of Classification Search
None
See application file for complete search history.

(56) References Cited

U.S. PATENT DOCUMENTS

| | | | |
|---|---|---|---|
| 2,069,083 | A | 1/1937 | Adamson |
| 2,147,197 | A | 2/1939 | Glidden |
| 2,582,298 | A | 1/1952 | Ushakoff et al. |

(Continued)

FOREIGN PATENT DOCUMENTS

| | | |
|---|---|---|
| CN | 102578759 | 7/2012 |
| CN | 203665810 | 6/2014 |

(Continued)

OTHER PUBLICATIONS

Jones et al. (Joining Textiles:Principles and Applications, Jones, p. 232, 2013). (Year: 2013).*

(Continued)

*Primary Examiner* — Shawn Mckinnon
(74) *Attorney, Agent, or Firm* — Kilpatrick Townsend & Stockton LLP

(57) ABSTRACT

Described are methods of two-dimensionally and three-dimensionally forming an article of wear using vacuum forming in an automated process. In the two-dimensional method, the article of wear comprises a generally flat shape with three-dimensional features molded into the first material layer.

18 Claims, 37 Drawing Sheets

(51) Int. Cl.
*B29L 31/50* (2006.01)
*B29L 9/00* (2006.01)

(56) References Cited

U.S. PATENT DOCUMENTS

| | | | |
|---|---|---|---|
| 3,007,262 A | 11/1961 | Richards | |
| 3,231,454 A | 1/1966 | Williams | |
| 3,720,971 A | 3/1973 | Kearney et al. | |
| 3,769,723 A | 11/1973 | Masterson et al. | |
| 3,931,685 A | 1/1976 | Laukaitis | |
| 4,120,101 A | 10/1978 | Drew | |
| 4,356,642 A | 11/1982 | Herman | |
| 4,681,648 A * | 7/1987 | Maeda | B29C 51/00 156/210 |
| 4,811,497 A | 3/1989 | Merino | |
| 4,893,418 A * | 1/1990 | Ogden | A43B 17/00 36/154 |
| 5,275,775 A | 1/1994 | Riecken | |
| 5,358,394 A | 10/1994 | Riecken et al. | |
| 5,392,534 A | 2/1995 | Grim | |
| 5,404,659 A | 4/1995 | Burke et al. | |
| 5,529,826 A | 6/1996 | Tailor et al. | |
| 5,555,650 A | 9/1996 | Peel et al. | |
| 5,617,650 A | 4/1997 | Grim | |
| 5,797,200 A | 8/1998 | Hess et al. | |
| 5,879,614 A | 3/1999 | Harrison | |
| 5,940,991 A | 8/1999 | Cabalquinto | |
| 5,976,451 A | 11/1999 | Skaja et al. | |
| 5,987,778 A | 11/1999 | Stoner | |
| 6,299,962 B1 * | 10/2001 | Davis | A43B 23/0255 12/142 P |
| 6,533,885 B2 | 3/2003 | Davis et al. | |
| 6,558,784 B1 | 5/2003 | Norton et al. | |
| 6,670,029 B2 | 12/2003 | Norton et al. | |
| 7,080,467 B2 | 7/2006 | Marvin et al. | |
| 7,178,267 B2 | 2/2007 | Skaja et al. | |
| 7,350,321 B2 | 4/2008 | Soon et al. | |
| 7,464,489 B2 | 12/2008 | Ho | |
| 8,109,014 B2 | 2/2012 | Miller et al. | |
| 8,266,749 B2 | 9/2012 | Dua et al. | |
| 8,372,234 B2 | 2/2013 | Loveder | |
| 8,424,221 B2 | 4/2013 | Litchfield et al. | |
| 2002/0012784 A1 | 1/2002 | Norton et al. | |
| 2002/0078591 A1 | 6/2002 | Morrone | |
| 2003/0221336 A1 | 12/2003 | Krstic | |
| 2005/0126038 A1 * | 6/2005 | Skaja | B29D 35/122 36/25 R |
| 2006/0042125 A1 | 3/2006 | Chen et al. | |
| 2007/0022627 A1 | 2/2007 | Sokolowski et al. | |
| 2007/0056189 A1 | 3/2007 | Schafer et al. | |
| 2008/0196278 A1 * | 8/2008 | Zanatta | A43B 7/08 36/3 B |
| 2009/0025253 A1 | 1/2009 | Harper et al. | |
| 2012/0180340 A1 | 7/2012 | Crowley, II et al. | |
| 2012/0211928 A1 | 8/2012 | Takai et al. | |
| 2012/0297643 A1 * | 11/2012 | Shaffer | A43B 1/0027 36/83 |
| 2013/0014900 A1 | 1/2013 | Hull et al. | |
| 2013/0042501 A1 | 2/2013 | Velazquez et al. | |
| 2013/0131854 A1 | 5/2013 | Regan et al. | |
| 2013/0152423 A1 | 6/2013 | Wu | |
| 2013/0180023 A1 * | 7/2013 | Gross | A43B 17/02 2/22 |
| 2014/0237738 A1 | 8/2014 | Johnson et al. | |
| 2014/0237853 A1 | 8/2014 | Fisher et al. | |
| 2014/0239556 A1 | 8/2014 | Fisher et al. | |
| 2015/0101133 A1 | 4/2015 | Manz et al. | |
| 2015/0101134 A1 | 4/2015 | Manz et al. | |
| 2015/0208762 A1 | 7/2015 | Reinhardt et al. | |
| 2015/0210034 A1 | 7/2015 | Tarrier et al. | |
| 2015/0223552 A1 | 8/2015 | Love et al. | |
| 2015/0282544 A1 | 10/2015 | Lankes et al. | |
| 2015/0305448 A1 | 10/2015 | Cavaliere et al. | |
| 2017/0099908 A1 | 4/2017 | Lee et al. | |
| 2017/0099909 A1 | 4/2017 | Lee et al. | |

FOREIGN PATENT DOCUMENTS

| | | |
|---|---|---|
| DE | 602004005441 | 5/2007 |
| DE | 2011100642 | * 11/2012 |
| DE | 102011100642 | 11/2012 |
| EP | 0930962 | 6/2003 |
| EP | 1621089 | 2/2006 |
| EP | 2316292 | 7/2014 |
| EP | 2881236 | 6/2015 |
| EP | 2904920 | 8/2015 |
| EP | 3266329 | 1/2018 |
| GB | 1442343 | 7/1976 |
| JP | 422125 | 2/1967 |
| JP | 45-10357 | 5/1970 |
| JP | H07-40486 | 2/1995 |
| JP | 3052665 | 7/1998 |
| JP | 2009219786 | 10/2009 |
| JP | 2011092724 | 5/2011 |
| JP | 5075391 | 11/2012 |
| JP | 2014210179 | 11/2014 |
| WO | 0036943 | 6/2000 |
| WO | 2013123922 | 8/2013 |
| WO | 2014070018 | 5/2014 |
| WO | 2014130319 | 8/2014 |
| WO | 2015167645 | 11/2015 |

OTHER PUBLICATIONS

Machine translation of DE2011100642 (Year: 2013).*
European Application No. 15194226.5, Office Action dated Aug. 20, 2019, 7 pages.
"Nike Unveils Seamless, Thermo-Molded "Vac Tech" Sneakers", available at http://www.ecouterre.com/nike-unveils-seamless-thermo-molded-vac-tech-sneakers known to Applicant no later than Oct. 16, 2013), Oct. 12, 2011, 12 pages.
"Nike Vac Tech Premium Wheat Pack", http://www.kicksonfire.com/tag/nike-vac-tech-premium-wheat-pack, Oct. 16, 2013, 4 pages.
"Nike's New Thermo-Molded Sneakers Are Like Sculptures For Your Feet _ Co.Design _ business + design", available at http://www.fastcodesign.com/1665178/nike-s-new-thermo-molded-sneakers-are-like-sculptures-for-your-feet (known to Applicant no later than Oct. 16, 2013), 3 pages.
Chinese Patent Application No. 201510770625.0 , Office Action dated Apr. 12, 2017, 14 pages (6 pages of English Translation and 7 pages of the original document).
European Patent Application No. 15194226.5 , Extended European search report dated Sep. 12, 2016, 14 pages.
Chinese Patent Application No. 201510770625.0, Office Action, dated Aug. 3, 2018, 12 pages (English machine translation provided).
Chinese Patent Application No. 201510770625.0, Office Action, dated Jan. 2, 2018, 12 pages (English machine translation provided).

* cited by examiner

METHODS OF VACUUM FORMING ARTICLES OF WEAR

CROSS REFERENCE TO RELATED APPLICATIONS

This is a continuation of U.S. patent application Ser. No. 14/540,451 entitled "Methods of Vacuum Forming Articles of Wear" filed Nov. 13, 2014 (Allowed), the contents of which are incorporated herein by reference.

FIELD OF THE INVENTION

The present invention relates to articles of wear formed using two-dimensional and three-dimensional vacuum forming methods.

BACKGROUND

Conventionally, shoe uppers are formed by assembling numerous components, which is a labor-intensive and expensive process. In order to improve the efficiency of shoe manufacturing, efforts have been made to automate this process.

For example, in certain cases, conventional shoe materials, such as leather, have been replaced by plastic materials, which can be molded into a particular shape using known vacuum forming techniques. In many cases, however, the three-dimensionally formed plastic piece often lacks flexibility which makes the resulting shoe uncomfortable to wear.

To address the comfort issue, attempts have been made to include a cushioning liner or other soft material between the plastic layers that are then vacuum formed together to form the three-dimensional part. However, because the cushioning layer is not in direct contact with the wearer's foot, the plastic molded shoe continues to lack the desired comfort and flexibility.

In some cases, a cushioning liner may be attached in the inner surface of the three-dimensionally molded part, but this additional step diminishes the efficiencies gained from vacuum molding by re-introducing manual labor back into the manufacturing process.

Furthermore, even though vacuum forming may automate certain aspects of the process, the vacuum forming process typically requires additional manual steps to place the materials into the mold and to remove each material from the mold.

As a result, it may be desirable to provide a manufacturing method that improves manufacturing efficiency by vacuum forming articles of wear as a single piece in a manner that does not introduce new manual steps into the process, while also producing articles of wear that have the desired amount of flexibility and comfort.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method of two-dimensionally forming an article of wear comprises positioning a first side of a first material layer adjacent a one-sided mold comprising cut-out locations, positioning a second material layer adjacent a second side of the first material layer, applying a vacuum to the first side of the first material layer so that the first material layer is molded to the cut-out locations within the one-sided mold, and bonding the second material layer to the first material layer in areas outside the cut-out locations of the one-sided mold.

In some embodiments, the method further comprises applying heat to the first material layer and the second material layer while applying the vacuum to the first side of the first material layer. The method may also comprise pre-heating at least the first material layer prior to positioning the first side of the first material layer adjacent the one-sided mold.

The method may comprise cutting the article of wear out of the first material layer and the second material layer. In further embodiments, the method comprises separating the cut article of wear from the first material layer and the second material layer.

According to some embodiments, the first material layer is a non-breathable film, and the second material layer is a breathable material.

The article of wear may comprise a formed plate having air pockets sandwiched between the first material layer and the second material layer. In some embodiments, the method comprises coupling sides of the formed plate to an upper so that the second material layer is facing a wearer's foot to provide breathability and wicking to the wearer's foot. The method may also comprise coupling sides of the formed plate to an upper so that the first material layer is facing a wearer's foot to provide a waterproof upper.

In some embodiments, applying the vacuum to the first side of the first material layer does not cause the second material layer to become molded to the cut-out locations within the one-sided mold.

In some embodiments, the article of wear comprises a generally flat shape with three-dimensional features molded into the first material layer. The three-dimensional features may comprise one or more of embossing, de-bossing, and texture features.

According to certain embodiments of the present invention, a system for vacuum forming articles of wear comprises a frame supporting a vacuum table comprising a one-sided mold, a seal frame coupled to the frame and positioned above the vacuum table, wherein the seal frame is configured to surround the one-sided mold, and a heating element slidingly coupled to the frame above the seal frame.

In some embodiments, the system further comprises a roller coupled to a pair of tracks positioned in opposing sides of the seal frame. The system may also comprise one or more heating elements positioned adjacent the vacuum table. In certain embodiments, the system further comprises a cutting tool mounted to the frame above the vacuum table.

In further embodiments, the system further comprises a retrieval device slidingly coupled to the frame. A plurality of telescoping arms may be positioned on the retrieval device.

According to certain embodiments of the present invention, an article of wear comprises a generally flat shape formed by a first material layer formed of non-breathable material, wherein the first material layer comprises three-dimensional features, and a second material layer formed of breathable material, wherein the second material layer forms a locking layer with the first material layer that maintains a shape of the three-dimensional features when the article of wear is transitioned from the generally flat shape to a three-dimensional structure.

In some embodiments, the second material layer maintains the shape of the three-dimensional features when the article of wear is transitioned from the generally flat shape to the three-dimensional structure by having a low amount of stretch or no stretch.

BRIEF DESCRIPTION OF THE DRAWINGS

In the following detailed description, embodiments of the invention are described referring to the following figures.

DETAILED DESCRIPTION

Figure 1:
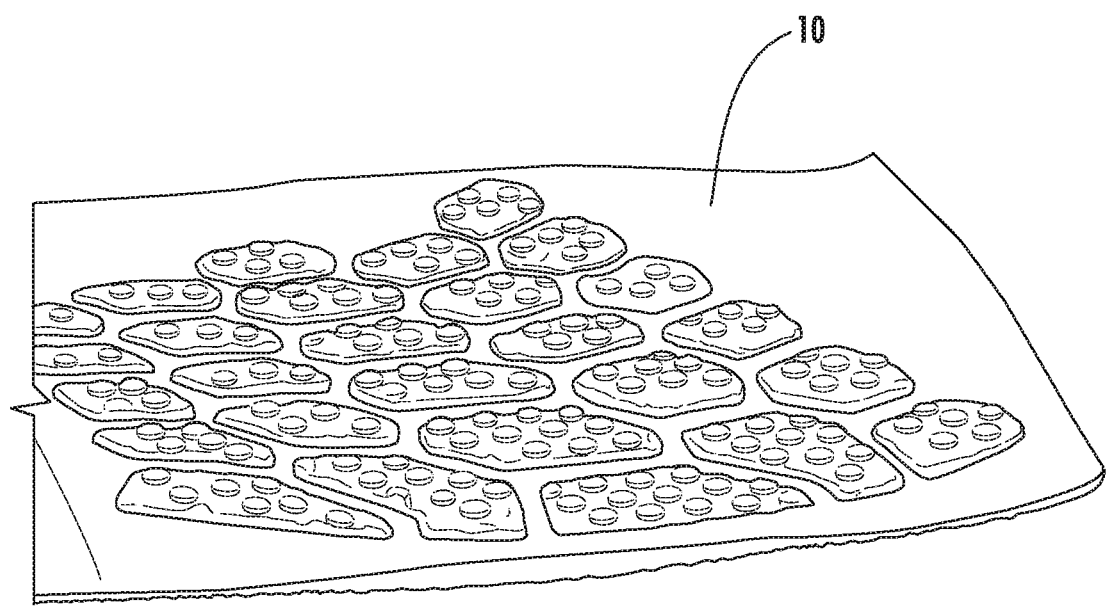
FIG. 1 is a perspective view of an article of wear formed by a two-dimensional vacuum forming process, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

According to certain embodiments, as illustrated in FIGS. 1-37, the present invention comprises apparel, footwear, sports equipment, and accessories ("articles of wear 10"), in which the articles of wear 10 or components thereof are formed from at least one of a two-dimensional vacuum forming process 12 or a three-dimensional vacuum forming process 14. A person of ordinary skill in the relevant art will understand that the two-dimensional vacuum forming process 12 or the three-dimensional vacuum forming process 14 may be used to form any suitable wear item or component thereof.

Two-Dimensional and Three-Dimensional Vacuum Forming Materials

As best illustrated in FIGS. 16-27, at least one of the material layers 16, 18 is included in the two-dimensional vacuum forming process 12 and/or the three-dimensional vacuum forming process 14. The first material layer 16 comprises a material that is suitable for being molded via vacuum forming. Examples of material layer 16 include but are not limited to non-breathable films, synthetic and/or natural leather, various fabrics and meshes, ethylene-vinyl acetate ("EVA"), polyurethane ("PU"), thermoplastic polyurethane ("TPU"), other thermoplastic materials, or any other material having similar properties that are conducive to molding via vacuum forming. The second material layer 18 comprises a breathable material, examples of which include but are not limited to mesh, fabric, or other suitable breathable materials having a low amount of stretch or no stretch. In certain embodiments, the second material layer 18 may comprise a breathable material have a limited amount of stretch in certain directions, and no stretch in other directions. For example, such materials are described in U.S. application Ser. No. 14/165,468, filed on Jan. 27, 2014; U.S. application Ser. No. 14/165,499, filed on Jan. 27, 2014; and U.S. application Ser. No. 14/246,740, filed on Apr. 7, 2014.

Figure 16:
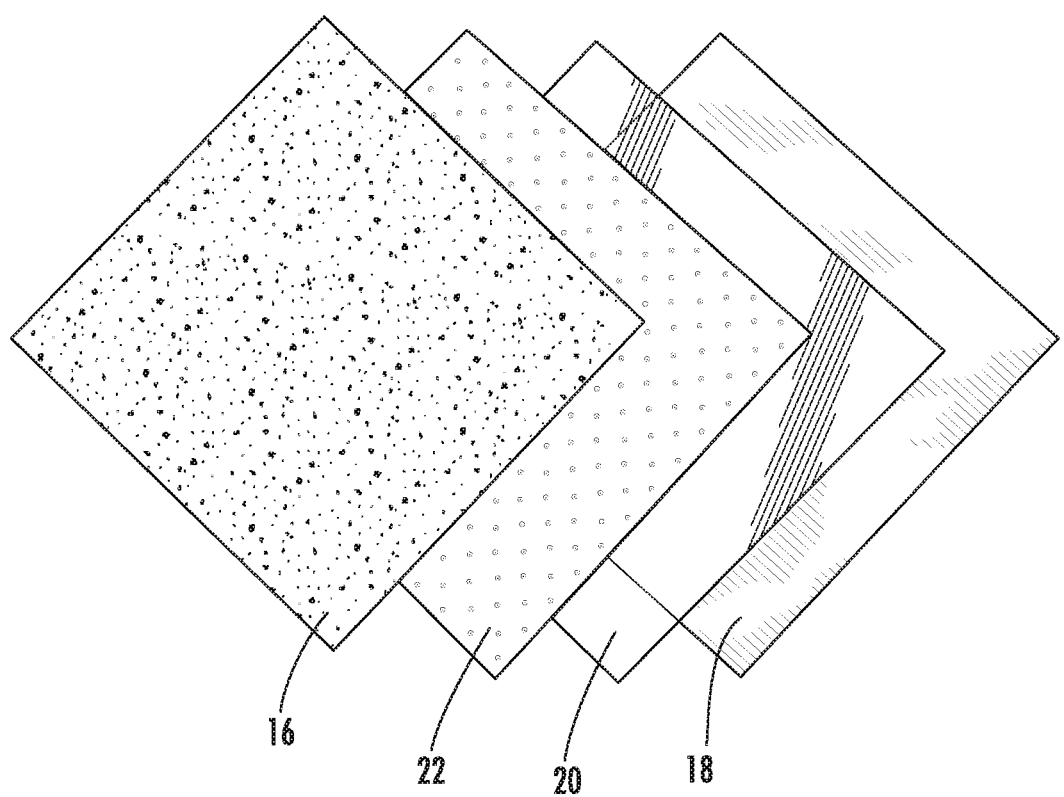
FIG. 16 is a top view of a material layers for use with a two-dimensional or three-dimensional vacuum forming process, according to certain embodiments of the present invention.

Additional layers that may be included in the two-dimensional vacuum forming process 12 and/or the three-dimensional vacuum forming process 14 include but are not limited to stretchable fabrics, sandwich meshes, woven materials, non-woven materials, and other similar materials. These additional layers may be positioned between the first material layer 16 and the second material layer 18, below the first material layer 16, above the second material layer 18, or any suitable combination thereof. For example, FIG. 16 illustrates a combination of four material layers that may be used with the two-dimensional vacuum forming process 12 or the three-dimensional vacuum forming process 14, which include the first material layer 16 (which may be a TPU material), the second material layer 18 (which may be an EVA material), a third material layer 20, and a fourth material layer 22. The third material layer 20 includes but is not limited to "hot melt", which is a generic term for heat activated adhesive layers, and other similar materials. The fourth material layer 22 includes but is not limited to stretchable fabrics, sandwich meshes, woven materials, non-woven materials, and other similar materials.

Figure 19:
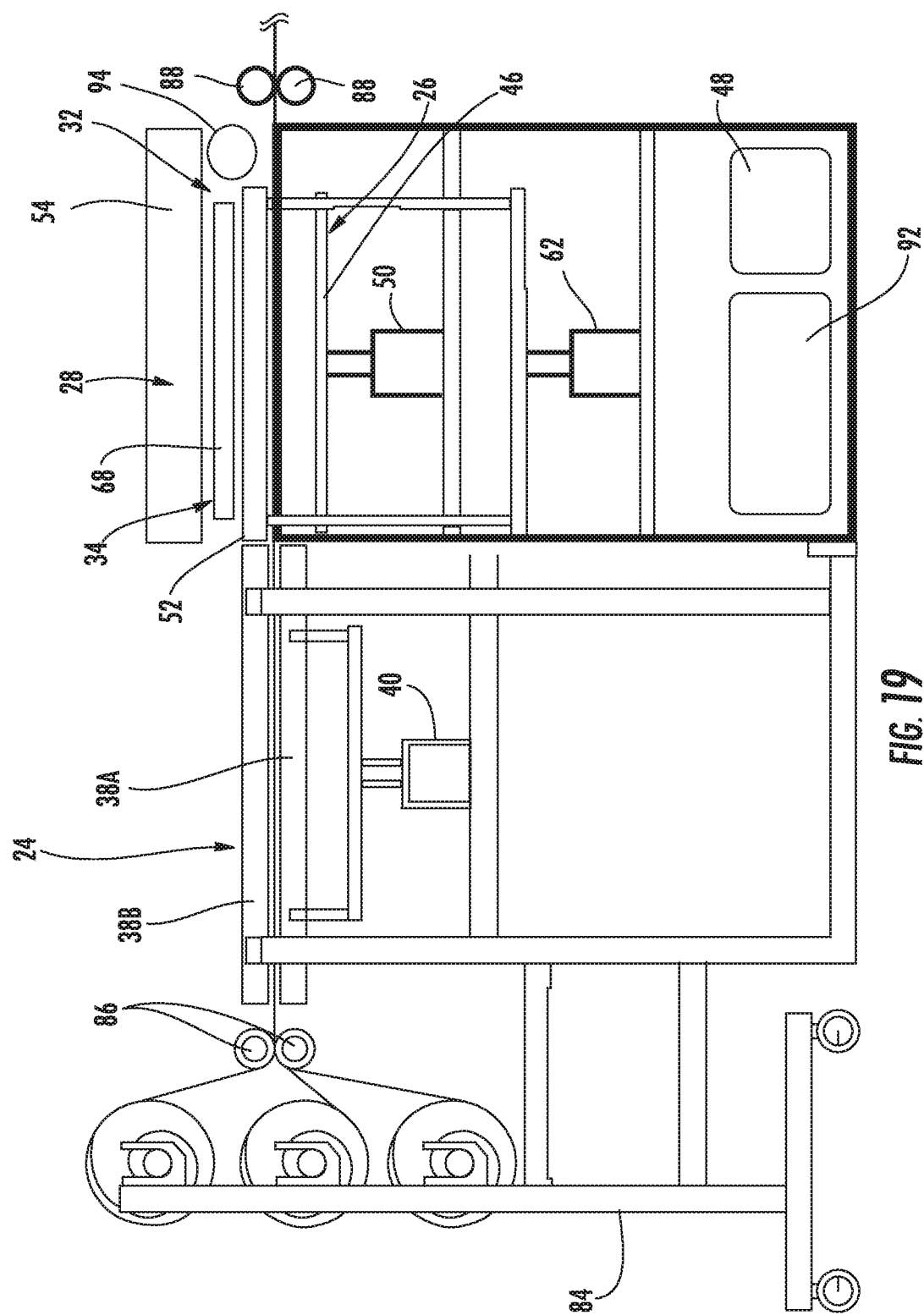
FIG. 19 is a schematic of components for performing steps of a two-dimensional or a three-dimensional vacuum forming process, according to certain embodiments of the present invention.

In other embodiments, as illustrated in FIG. 19, a combination of three material layers 16, 18, 20 may be used with the two-dimensional vacuum forming process 12 or the three-dimensional vacuum forming process 14. A person of ordinary skill in the relevant art will understand that any suitable number and combination of layers may be used with the two-dimensional vacuum forming process 12 or the three-dimensional vacuum forming process 14 as needed to achieve the desired properties and performance characteristics of the articles of wear 10.

Two-Dimensional Vacuum Forming Process

According to some embodiments, as illustrated in FIGS. 17-27, the two-dimensional vacuum forming process 12 comprises a pre-heating step 24, a vacuum forming step 26, a heating step 28, a laminating step 30, a cooling step 32, a cutting step 34, and/or a separating step 36.

Pre-Heating Step

In these embodiments, as illustrated in FIGS. 17 and 19-22, at least the first material layer 16 is pre-heated in the pre-heating step 24. A person of ordinary skill in the relevant art will understand that heating may be achieved by any suitable method. All means of heat transfer (conduction, convection, and radiation) are all reasonably assumed to be viable. In certain embodiments, heat may be applied to the material handling roller by heat-lamp, by steam, friction, or other similar means.

In certain embodiments, one or more heating elements 38 may be used to perform the pre-heating step 24. For example, a series of strip heaters may be mounted to an aluminum plate or a ceramic plate may be used as one or both of the heating elements 38. In some embodiments, as shown in FIG. 19, one heating element 38A is positioned below the first material layer 16, and a second heating element 38B is positioned above the third material layer 20. In these embodiments, the second heating element 38B may be set to a different temperature than the first heating element 38A, depending on the type of material and the specific material properties of the material layers, and the type of molding design, among other factors.

Figure 20:
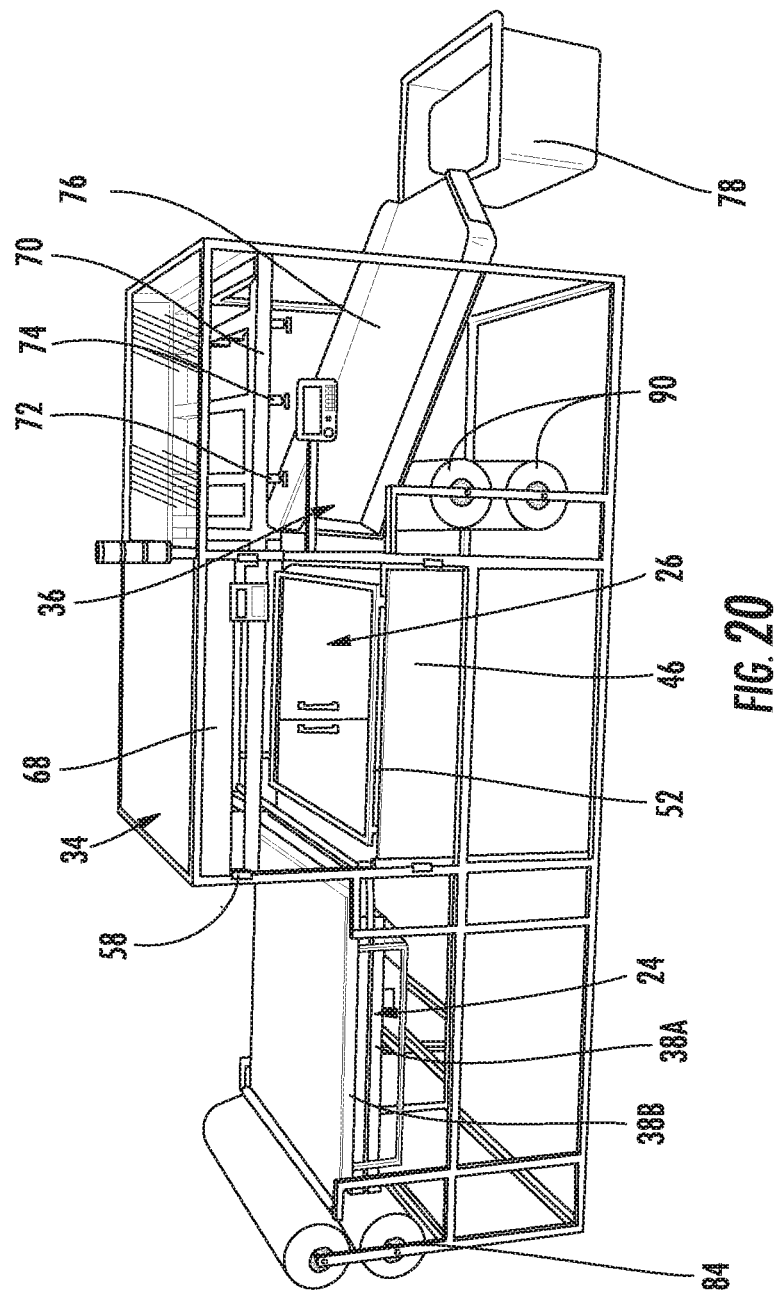
FIG. 20 is a perspective view of components for performing steps of a two-dimensional or a three-dimensional vacuum forming process, according to certain embodiments of the present invention.
Figure 21:
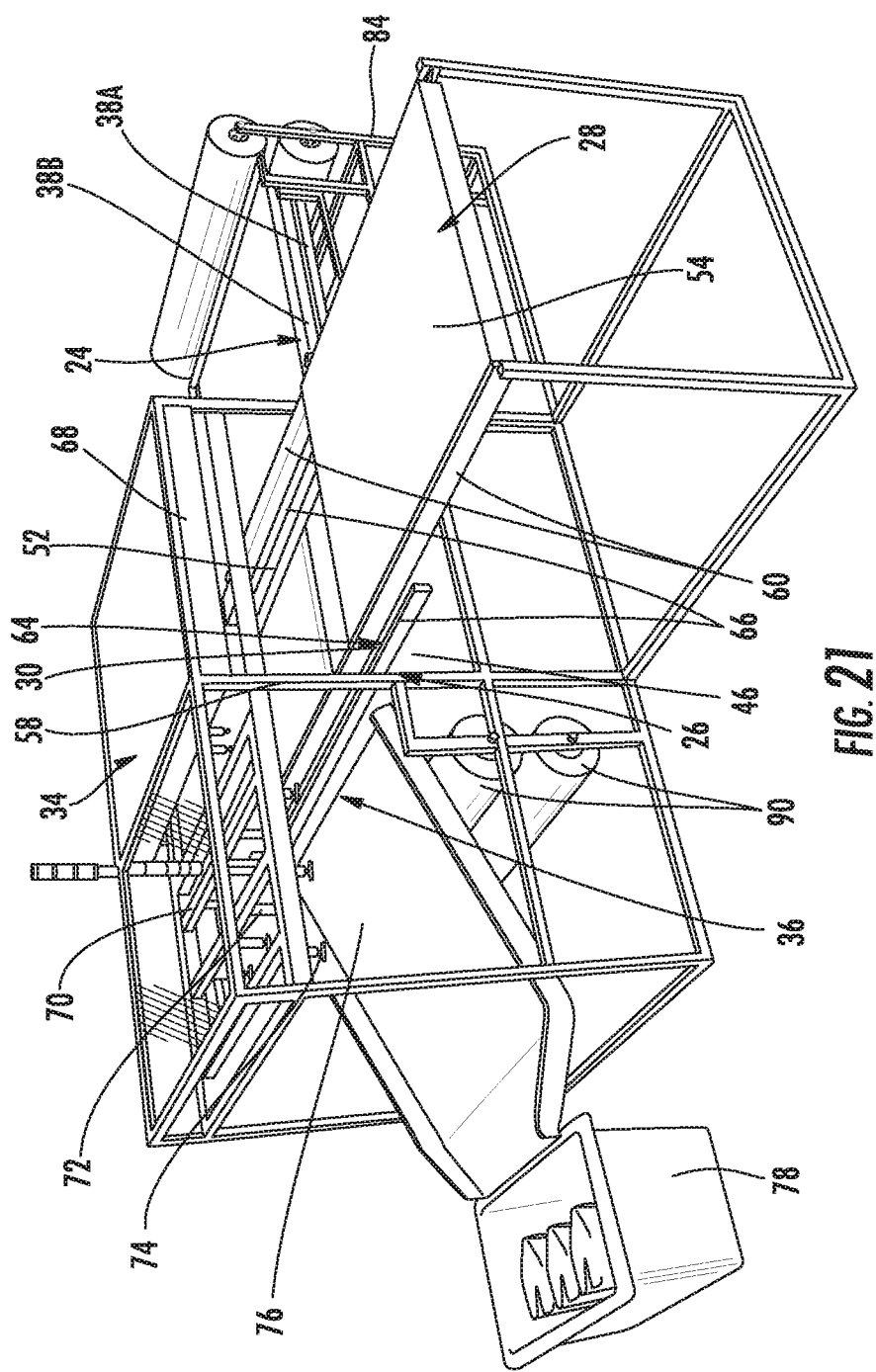
FIG. 21 is a rear perspective view of the components of FIG. 20.
Figure 22:
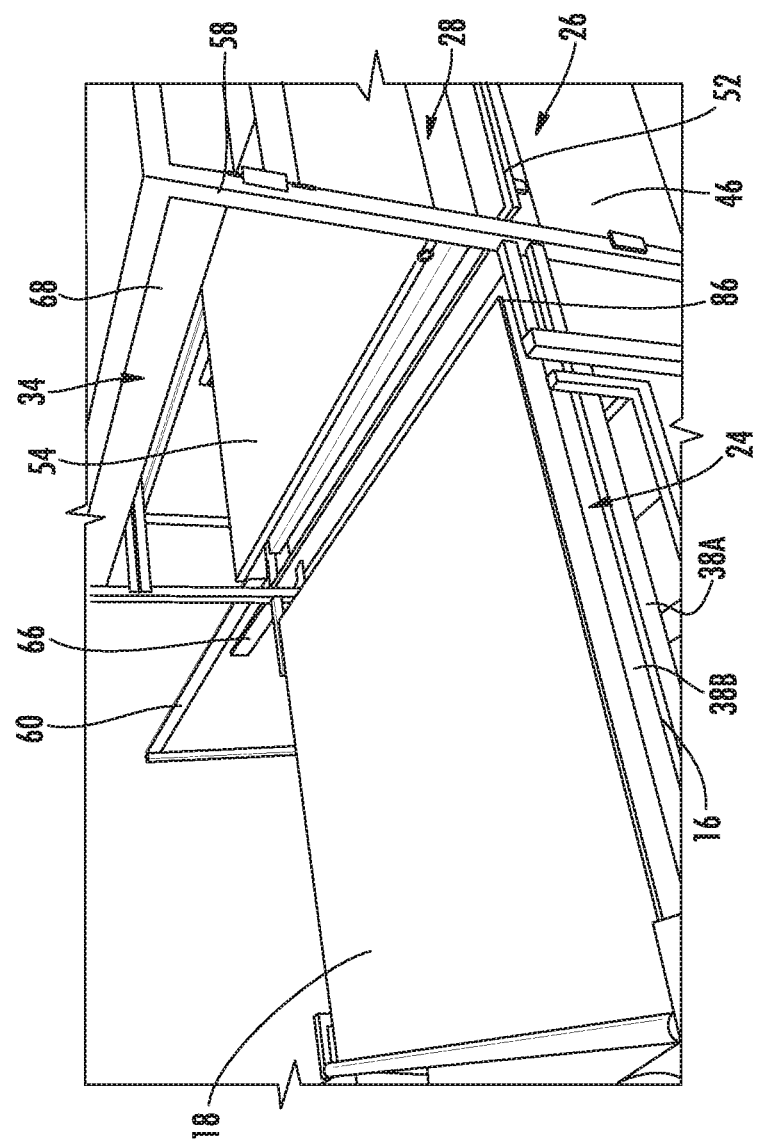
FIG. 22 is a partial perspective view of the components of FIG. 20 for performing pre-heating, vacuum forming, and heating steps.
Figure 23:
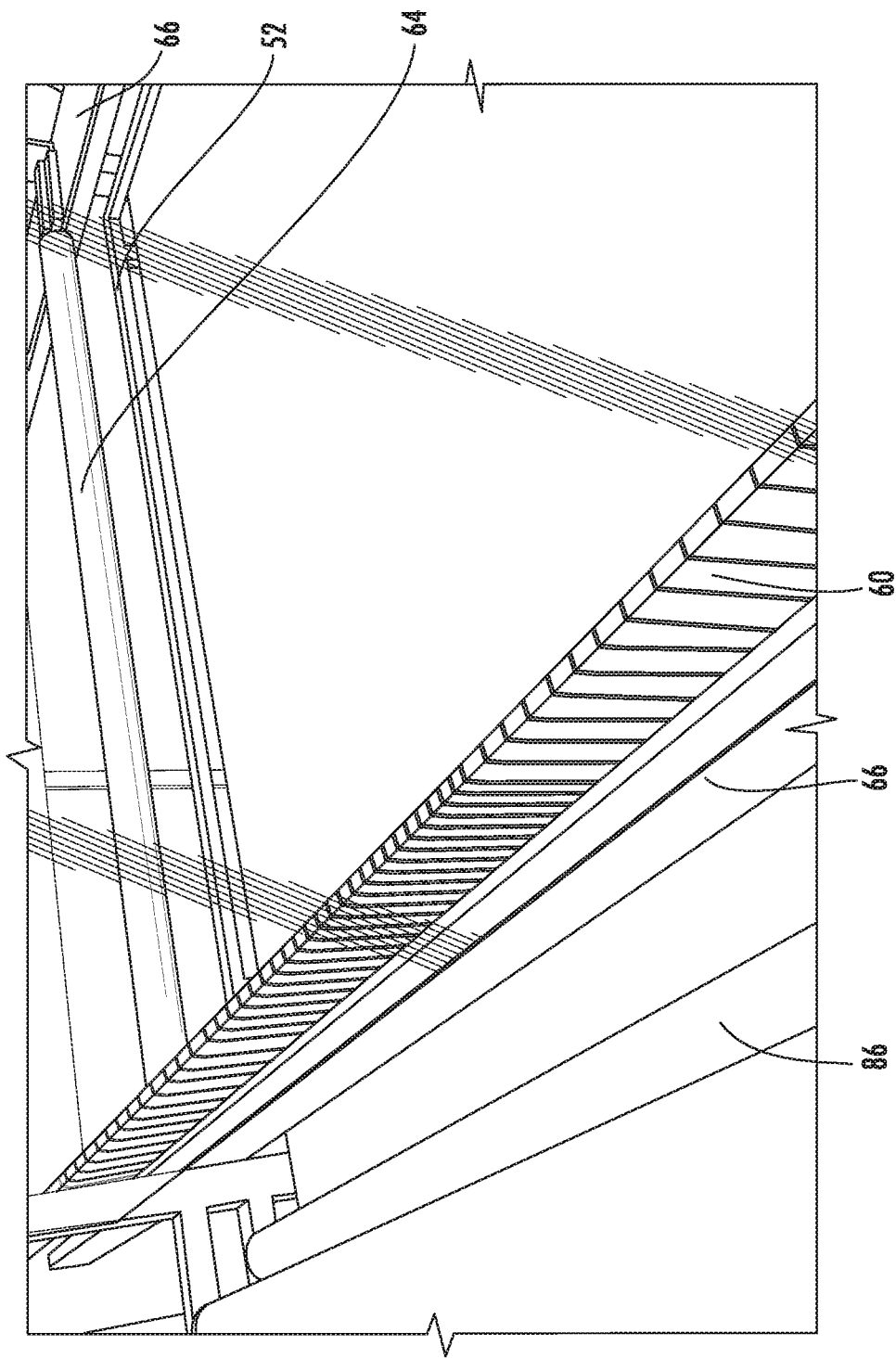
FIG. 23 is a partial perspective view of the components of FIG. 20 for performing vacuum forming and laminating steps.
Figure 24:
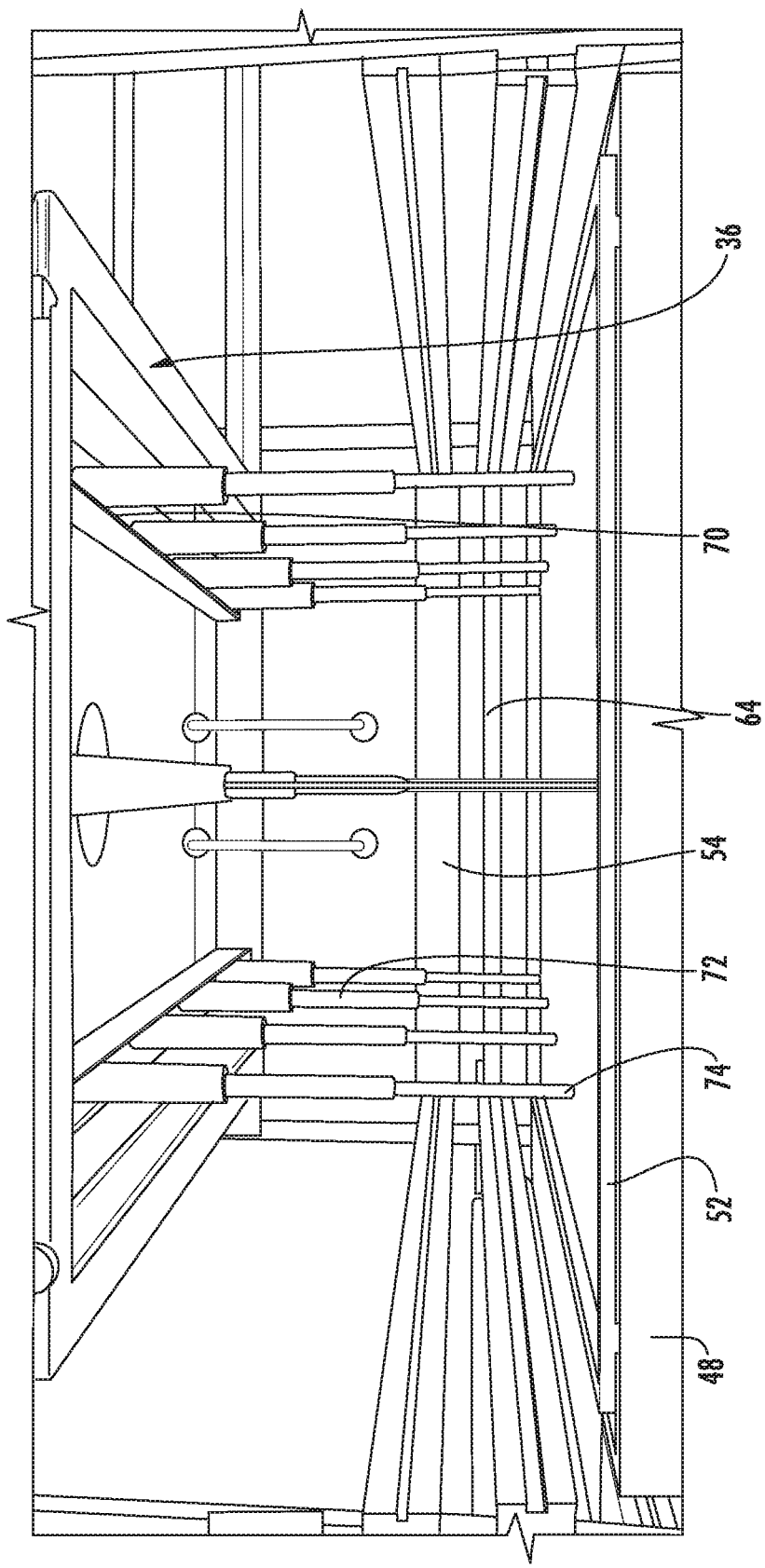
FIG. 24 is a partial perspective view of the components of FIG. 20 for performing cutting and separating steps.
Figure 25:
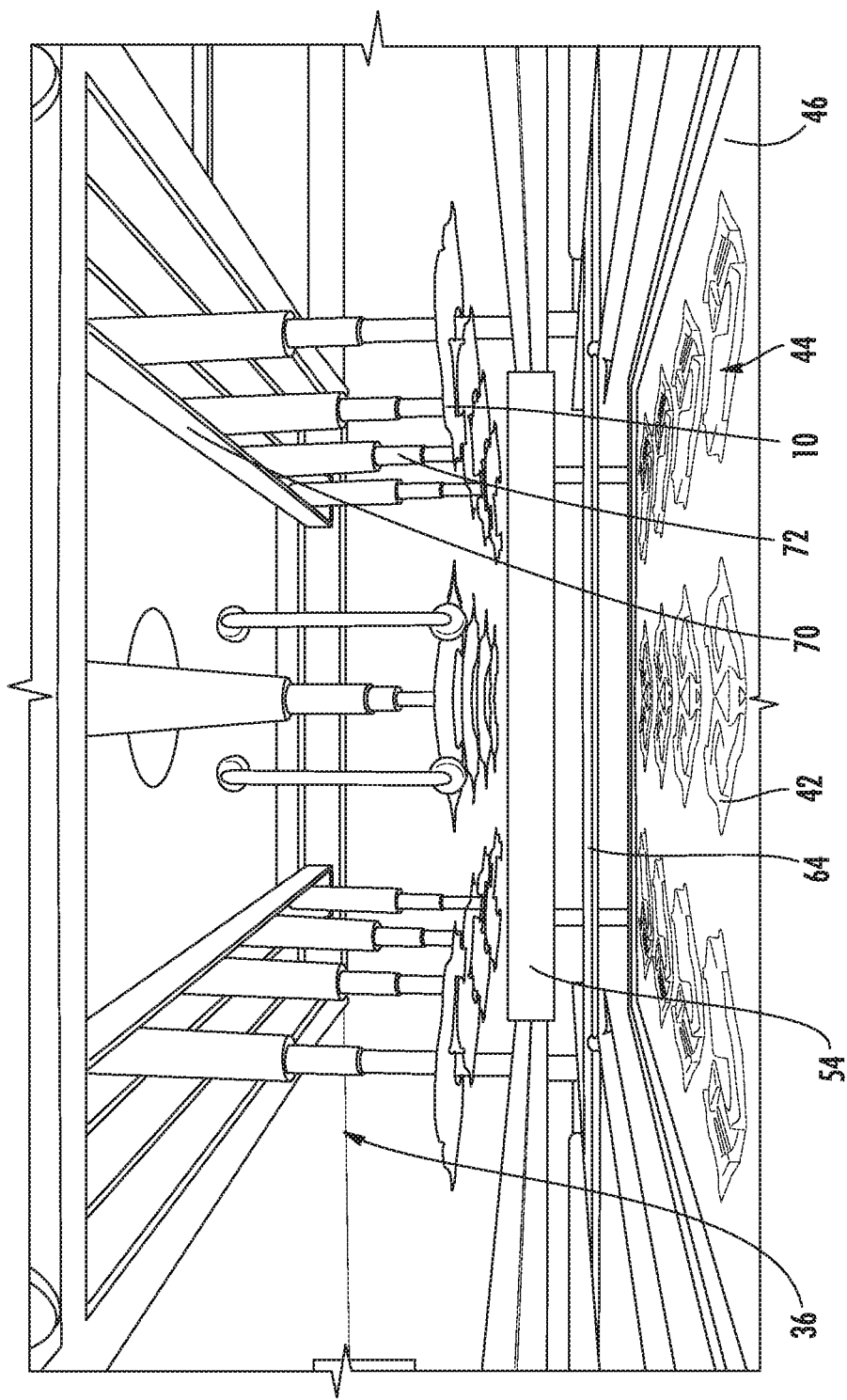
FIG. 25 is a partial perspective view of the components of FIG. 20 performing the separating step to remove articles of wear from the material layers.
Figure 26:
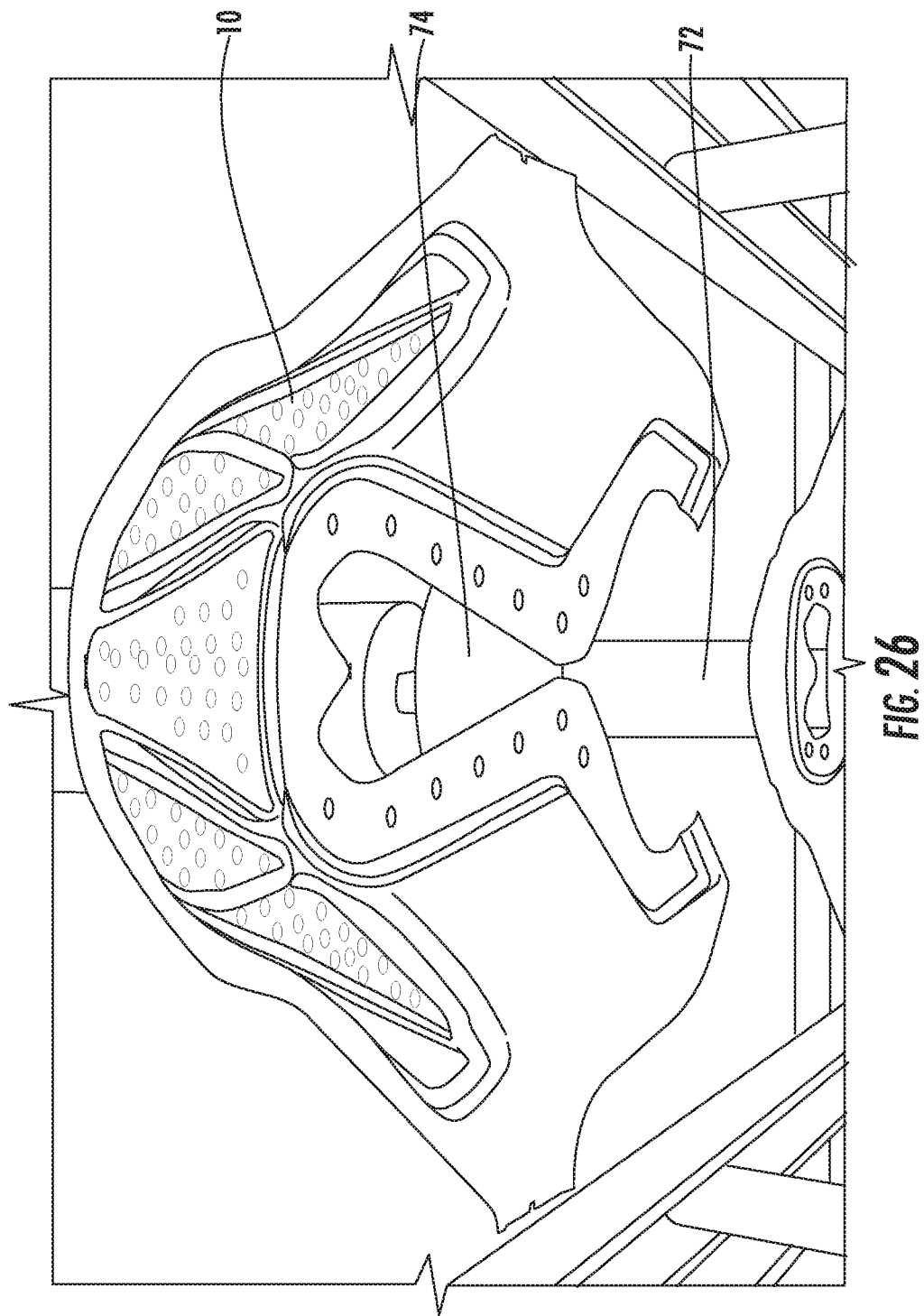
FIG. 26 is a partial perspective view of one of the articles of wear of FIG. 25 being held by a retrieval device.
Figure 27:
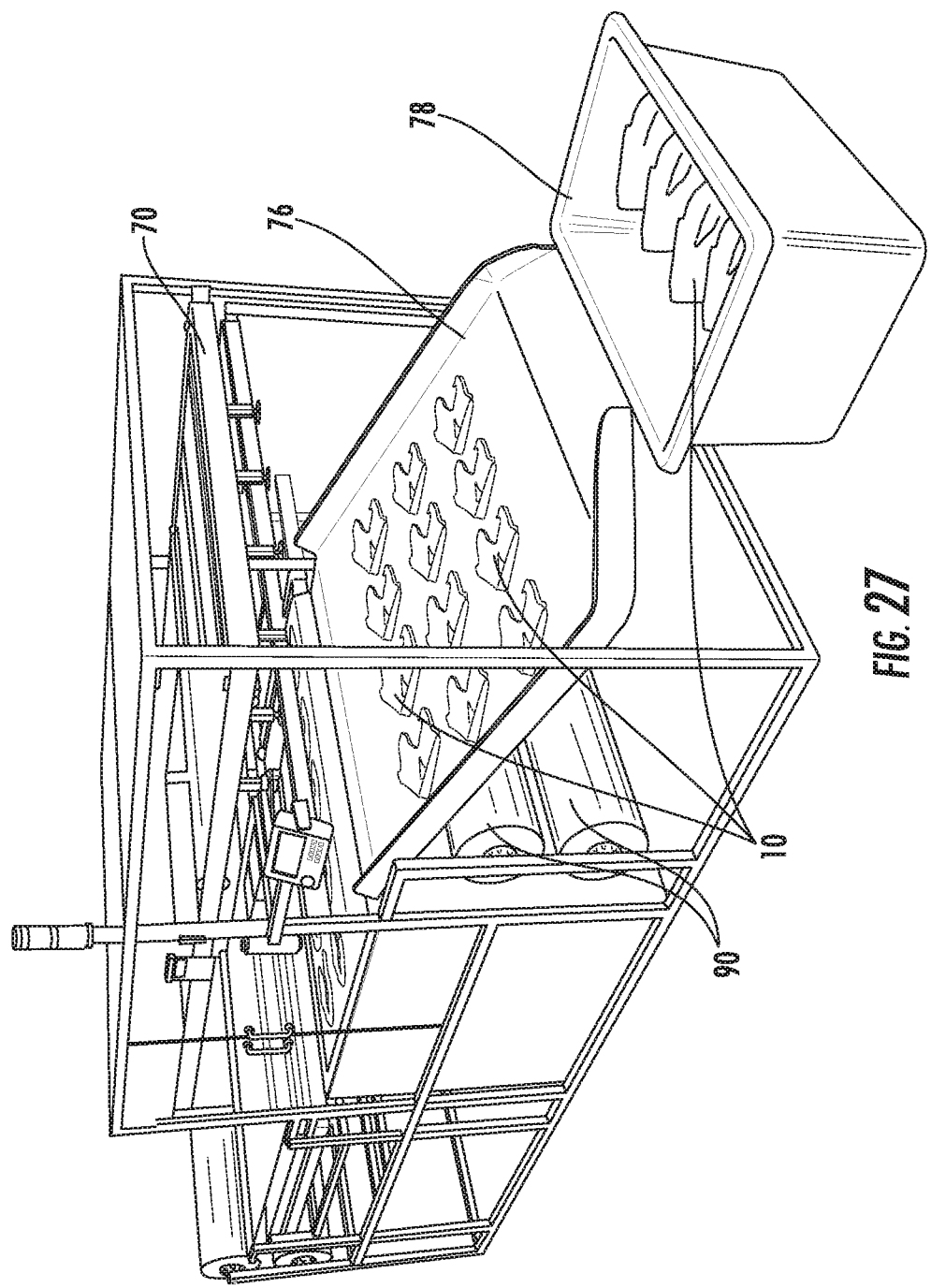
FIG. 27 is another perspective view of the components of FIG. 20 showing the articles of wear of FIG. 25 being transitioned into a collection device.
Figure 28:
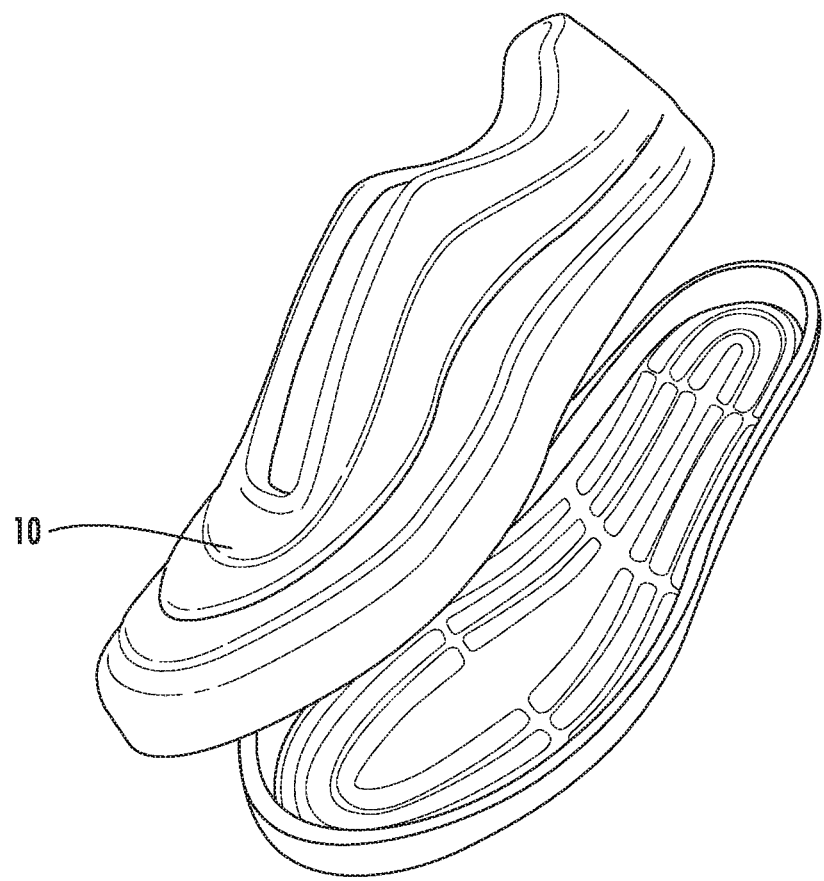
FIG. 28 is an exploded perspective view of an article of wear formed by a three-dimensional vacuum forming process, according to certain embodiments of the present invention.
Figure 29:
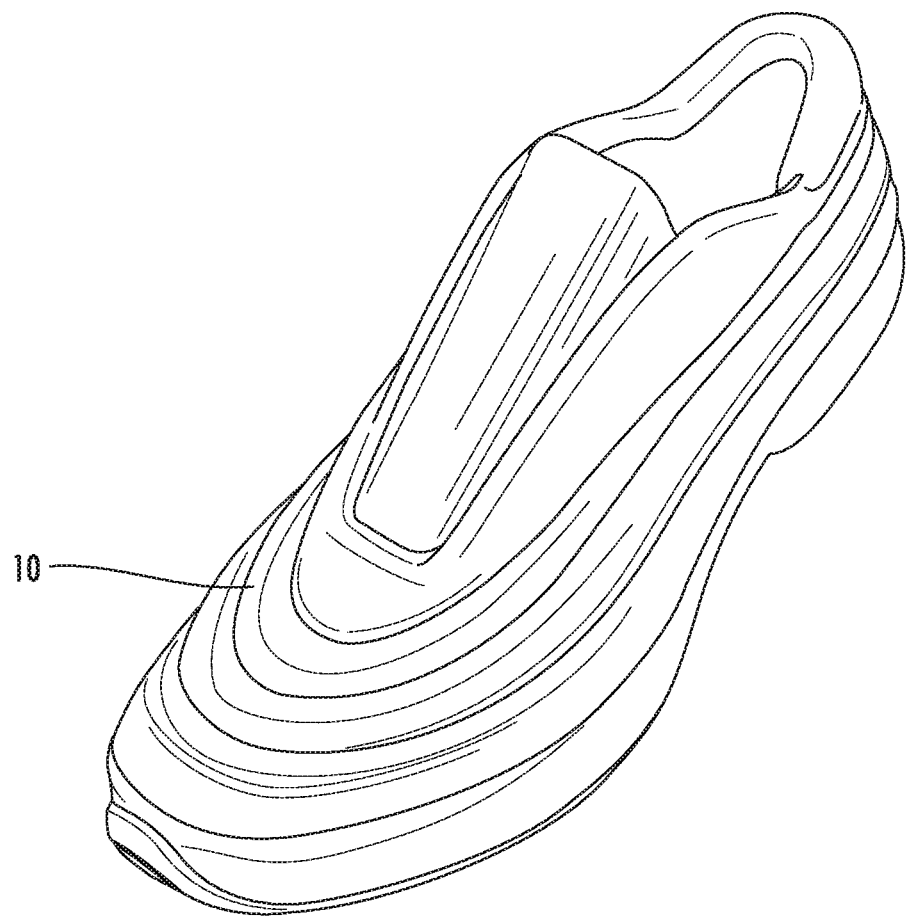
FIG. 29 is another perspective view of the article of wear of FIG. 28.

In other embodiments, as shown in FIGS. 20-22, the heating elements 38A, 38B are positioned on each side of the first material layer 16, while the other material layers are not subjected to the pre-heating step 24. A person of ordinary skill in the relevant art will understand that any suitable number and combination of material layers may be introduced into the pre-heating step 24 as needed or desired to achieve the desired outcome in the later steps of the two-dimensional vacuum forming process 12.

The desired temperature of at least the first material layer 16 may vary depending on the type of material and the specific material properties of the first material layer 16, and the type of molding design, among other factors. In particular, the pre-heating step 24 is designed to improve the ability to mold the first material layer 16 during the vacuum forming step 26, while not heating the material layers to a temperature where the second material layer 18 bonds to the first material layer 16 and/or any other intervening material layers. In addition, the temperature of the first material layer 16 exiting the pre-heating step 24 should not be so high that the first material layer 16 stretches instead of moves, particularly in the case of embodiments that utilize a continuous or semi-continuous two-dimensional vacuum forming process 12 design, as shown in FIGS. 17-27.

One or both heating elements 38A, 38B may be connected to one or more positioning devices 40, such as a pneumatic actuator, which are designed to control the vertical positioning of the heating elements 38. In these embodiments, the positioning device 40 may be configured to place one or both heating elements 38A, 38B in contact with or within close proximity of the material layers introduced into the pre-heating step 24 for a specified period of time so as to raise the temperature of the material layer or layers to a desired value before applying the vacuum forming step 26. In certain embodiments, the positioning device 40 may be configured to adjust the height of the first heating element 38A over a specified range of travel, while the second heating element 38B remains stationary, or vice versa, or to adjust the height of both elements 38A, 38B over the specified range of travel. According to certain embodiments, the specified range of travel is approximately 2 inches, but may be more or less depending on the number of layers, the material thickness, the available space, and other relevant design criteria.

Vacuum Forming Step

Once the first material layer 16 and/or the second material layer 18 have been pre-heated to the desired temperature, the layers 16, 18 are then positioned over a one-sided mold 42, which is positioned over a vacuum table 46. In particular, the layers 16, 18 are arranged so that the first material layer 16 contacts the mold 42, and the second material layer 18 is positioned on the opposing side of the first material layer 16.

Figure 8:
FIG. 8 is a perspective view of a shoe formed from a two-dimensional article of wear formed with the one-sided mold of FIG. 7 in a two-dimensional vacuum forming process, according to certain embodiments of the present invention.
Figure 9:
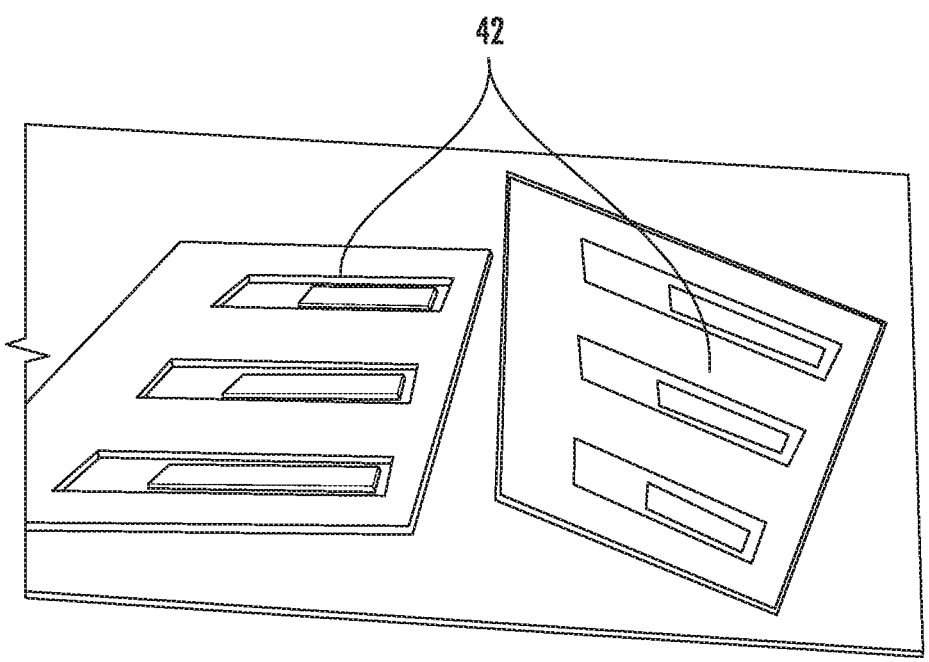
FIG. 9 is a top view of a one-sided mold for use with a two-dimensional vacuum forming process, according to certain embodiments of the present invention.
Figure 10:
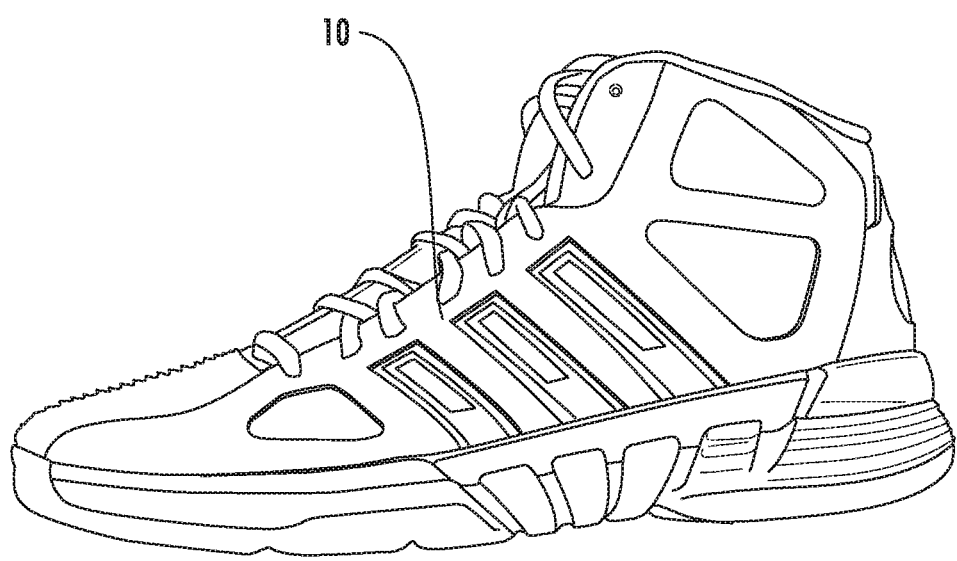
FIG. 10 is a perspective view of a shoe formed from a two-dimensional article of wear formed with the one-sided mold of FIG. 9 in a two-dimensional vacuum forming process, according to certain embodiments of the present invention.
Figure 11:
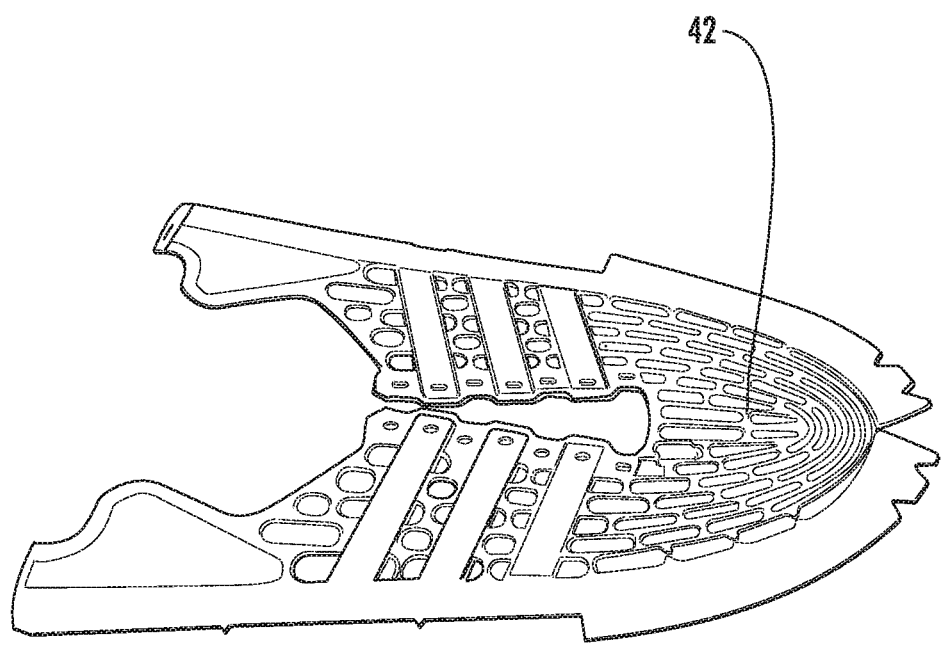
FIG. 11 is a top view of a one-sided mold for use with a two-dimensional vacuum forming process, according to certain embodiments of the present invention.
Figure 12:
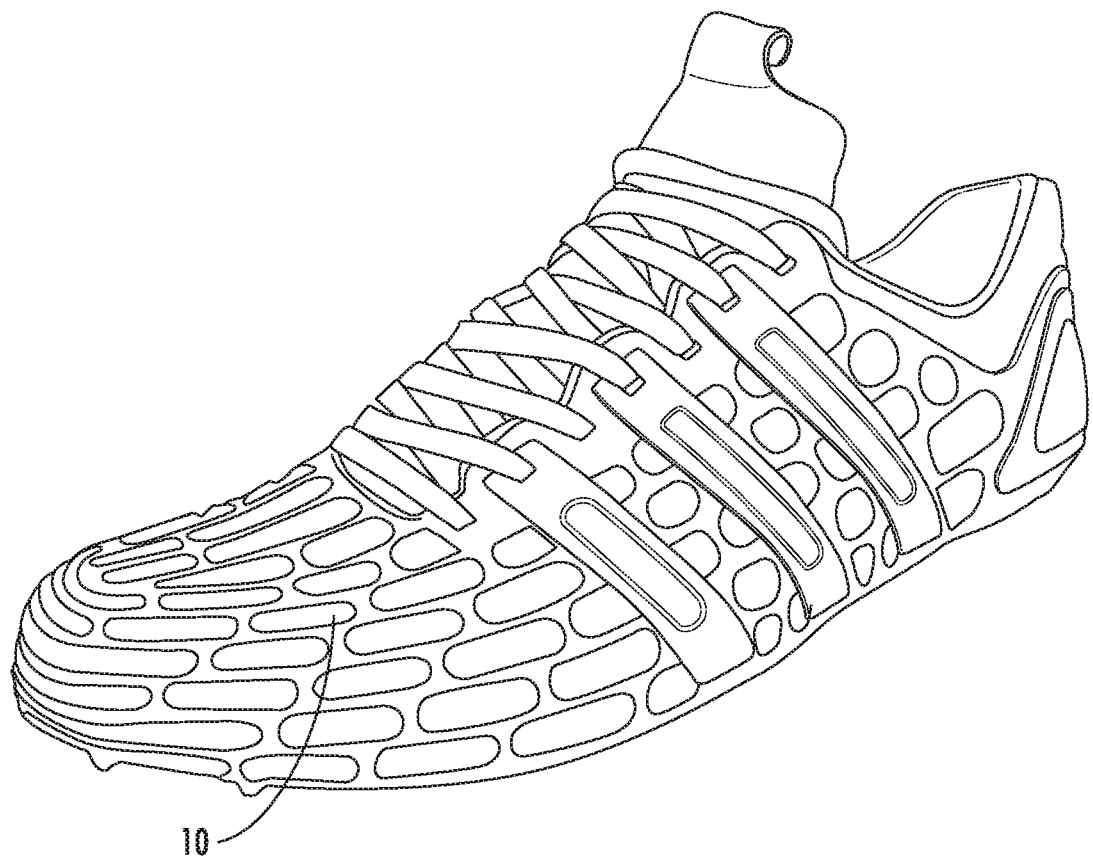
FIG. 12 is a perspective view of a shoe formed from a two-dimensional article of wear formed with the one-sided mold of FIG. 11 in a two-dimensional vacuum forming process, according to certain embodiments of the present invention.
Figure 13:
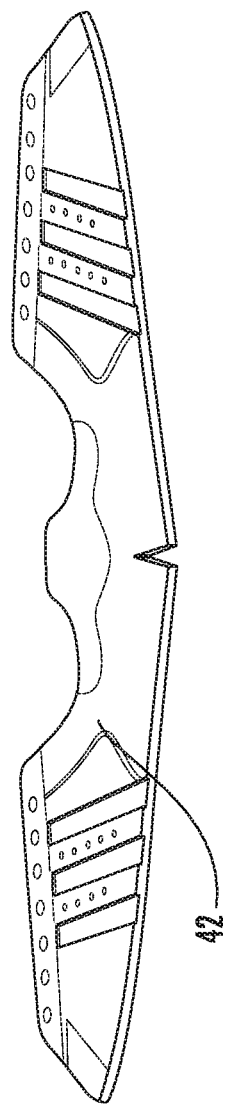
FIG. 13 is a top view of a one-sided mold for use with a two-dimensional vacuum forming process, according to certain embodiments of the present invention.
Figure 14:
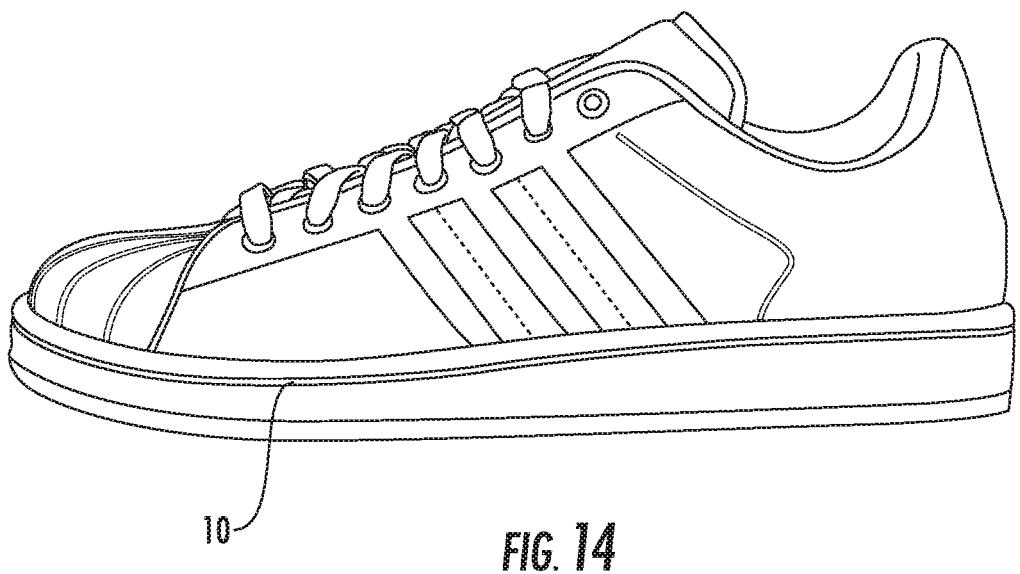
FIG. 14 is a perspective view of a shoe formed from a two-dimensional article of wear formed with the one-sided mold of FIG. 13 in a two-dimensional vacuum forming process, according to certain embodiments of the present invention.
Figure 15:
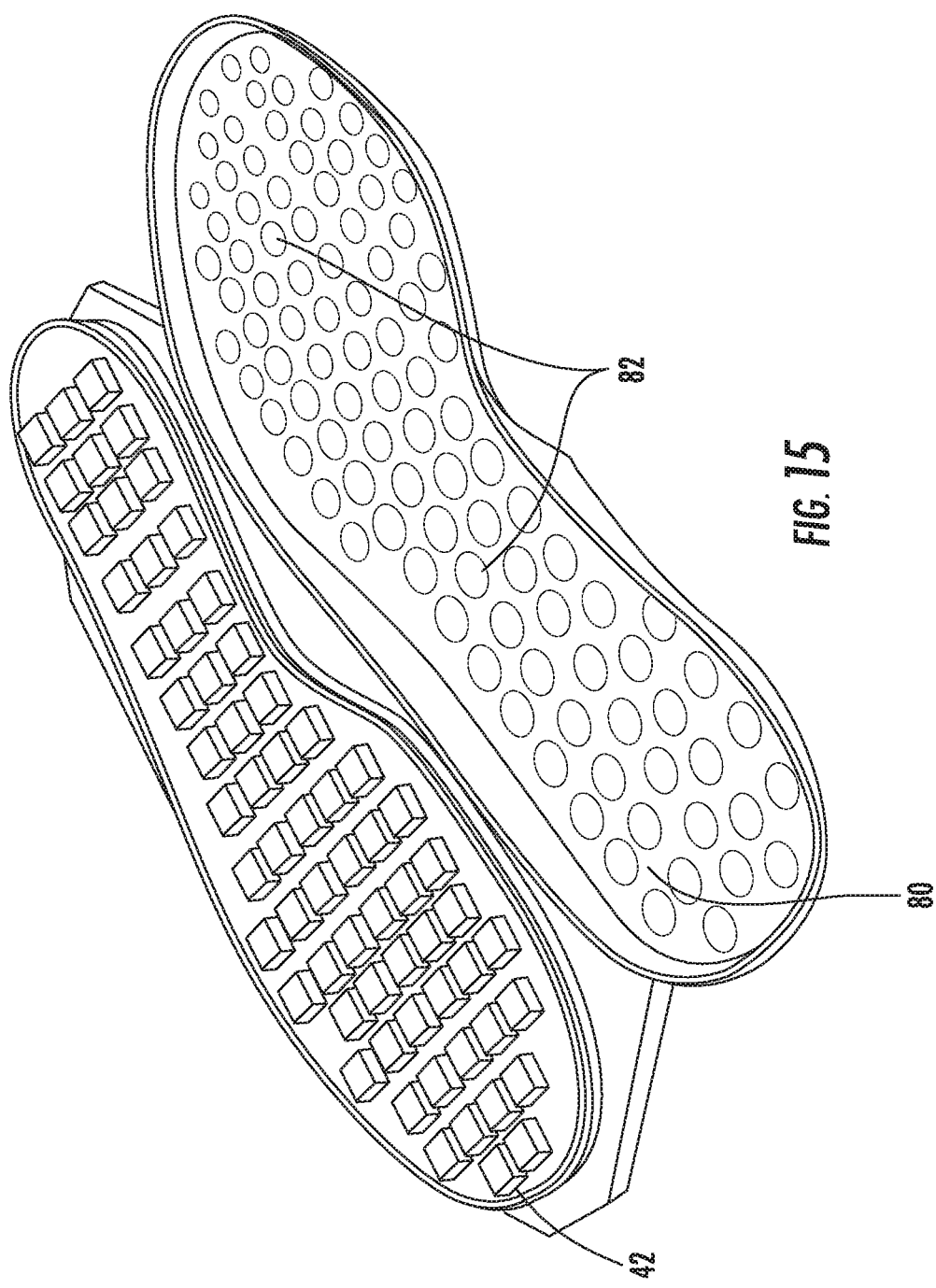
FIG. 15 is a top view of a one-sided mold for use with a two-dimensional vacuum forming process and a plate formed with the one-sided mold in a two-dimensional vacuum forming process, according to certain embodiments of the present invention.

Examples of one-sided molds 42 that are used to achieve a variety of types and shapes of articles of wear 10 are shown in FIGS. 2, 7, 9, 11, 13, and 15. The mold material includes but is not limited to acrylic, ceramic, various metals, other rigid and thermally conductive or non-conductive materials depending on process needs. For example, the molds 42 may be cut with a laser cutting tool, a water jet, a computer numerical control ("CNC") mill, or electrical discharge machining ("EDM") to provide cut-out locations 44. As shown in FIGS. 1, 4-6, 8, 10, 12, 14, 15, the cut-out locations 44 may be used to generate various effects, shaping, and/or entire components, which include but are not limited to embossing, de-bossing, texture features, liner assemblies, perimeter cutting, and/or perforations. For design variation, as shown in FIGS. 8, 10, and 12, multiple material layers of various colors may be used with the cut-out locations 44 in the mold 42 to show the colors of the various material layers in the article of wear 10.

Once the material layers 16, 18 are positioned over the mold 42 and at least a portion of the vacuum table 46, a vacuum pump 48, which is connected to the vacuum table 46, is activated to supply suction to the mold 42 positioned on the vacuum table 46. In certain embodiments, a booster tank 92 may be included to provide additional suction for the vacuum table 46. The suction created by the vacuum pump 48 causes the first material layer 16 to be drawn into the cut-out locations 44 within the mold 42. Because the second material layer 18 is breathable, the suction created by the vacuum pump 48 does not draw the second material layer 18 into the cut-out locations 44 within the mold 42. Because the material layers are not adhered or otherwise joined to one another at this point in the two-dimensional vacuum forming process, the second material layer 18 is relatively unaffected by the application of vacuum, while the first material layer 16 (and any other non-breathable layers positioned between the first material layer 16 and the second material layer 18) is molded into the cut-out locations 44 and otherwise molded around the shape of the mold 42.

In certain embodiments, as shown in FIG. 19, the vacuum table 46 may be connected to one or more positioning devices 50, such as a pneumatic actuator, that control the vertical positioning of the vacuum table 46. In these embodiments, the positioning device 50 may be configured to place the mold 42 located on the vacuum table 46 in contact with or within close proximity of the first material layer 16. To ensure a proper seal between the vacuum table 46 and the first material layer 16, a seal frame 52 may be positioned so as to contact or be within close proximity of the second material layer 18. The seal frame 52 may also be coupled to the positioning device 50 or may be mounted in a fixed location. Therefore, the positioning device 50 may be configured to adjust the height of the vacuum table 46 over a specified range of travel, while the seal frame 52 remains stationary, or vice versa, or adjust the height of both the vacuum table 46 and the seal frame 52 over the specified range of travel. According to certain embodiments, the specified range of travel is approximately 2 inches, but may be more or less depending on the number of layers, the material thickness, the available space, and other relevant design criteria.

Heating Step

In some embodiments, as illustrated in FIGS. 17, 19, and 21-22, the material layers are further heated in the heating step 28 while the vacuum forming step 26 is being performed. The additional heat from the heating step 28 assists the first material layer 16 in completely shaping to the cut-out locations 44 of the mold 42. In certain embodiments, one or more heating elements 54 may be used to perform the heating step 28. For example, a series of strip heaters may be mounted to an aluminum plate or a ceramic plate may be used as one or both of the heating elements 54.

The desired temperature of the first material layer 16 to be achieved by the heating step 28 will vary depending on the type of material and the specific material properties of the first material layer 16, and the type of molding design, among other factors. In some embodiments where the vacuum table 46 is located below the mold 42 and the first material layer 16, the heating element 54 is positioned so as to contact or be within close proximity of the second material layer 18. The second material layer 18 in turn contacts the first material layer 16 at contact areas 56 on the mold 42 surface where the applied vacuum has not drawn the first material layer 16 into the mold 42 and away from the second material layer 18.

In certain embodiments, as shown in FIGS. 21-22, the heating element 54 may be slidingly coupled to a frame 58 supporting the vacuum table 46 so that the heating element 54 may travel to the proper location above the second material layer 18 when the process is ready for the heating step 28, then return to a recessed position when the heating step 28 is complete. The heating element 54 may be further mounted to rails 60 that are substantially aligned with the location of the seal frame 52 so that the heating element 54 is aligned with the portion of the first material layer 16 that is under vacuum.

In certain embodiments, as shown in FIG. 19, the heating element 54 may be connected to one or more positioning devices 62, such as a pneumatic actuator, that control the vertical positioning of the heating element 54. In these embodiments, the positioning device 62 may be configured to adjust the height of the heating element 54 so that the heating element 54 is placed into contact with or be within close proximity of the second material layer 18. Therefore, the positioning device 62 may be configured to adjust the height of the heating element 54 over a specified range of travel. According to certain embodiments, the specified range of travel is approximately 2 inches, but may be more or less depending on the number of layers, the material thickness, the available space, and other relevant design criteria.

Laminating Step

In some embodiments, as illustrated in FIGS. 17-18, 21, and 23, the laminating step 30 is performed after the heating step 28, while the vacuum forming step 26 is still being performed. A roller 64 may be used to perform the laminating step 30. In some cases, the roller 64 may be heated to provide additional heat, along with pressure, to bond the first material layer 16 and the second material layer 18 at the contact areas 56 on the mold 42 surface.

The roller 64 may also be slidingly coupled to the frame 58 supporting the vacuum table 46. In particular, in certain embodiments, the roller 64 may be further mounted to rails 66 that are substantially aligned with the location of the seal frame 52 so that the roller 64 is aligned with the portion of the first material layer 16 that is under vacuum. In yet other embodiments, the roller 64 may be coupled to a pair of tracks positioned in opposing sides of the seal frame 52.

By bonding the second material layer 18 to the first material layer 16 while the first material layer 16 is being held in position against the mold by the applied vacuum, the second material layer 18 acts as a locking layer that maintains the shape of the molded first material layer 16 when the article of wear 10 is transitioned from a generally flat shape to a three-dimensional structure. In other words, the first material layer 16 is molded to have an embossed effect, wherein the embossed material is maintained by the superficial tension created in the first material layer 16 through the vacuum forming step 26 and the laminating step 30.

Cooling Step

Figure 17:
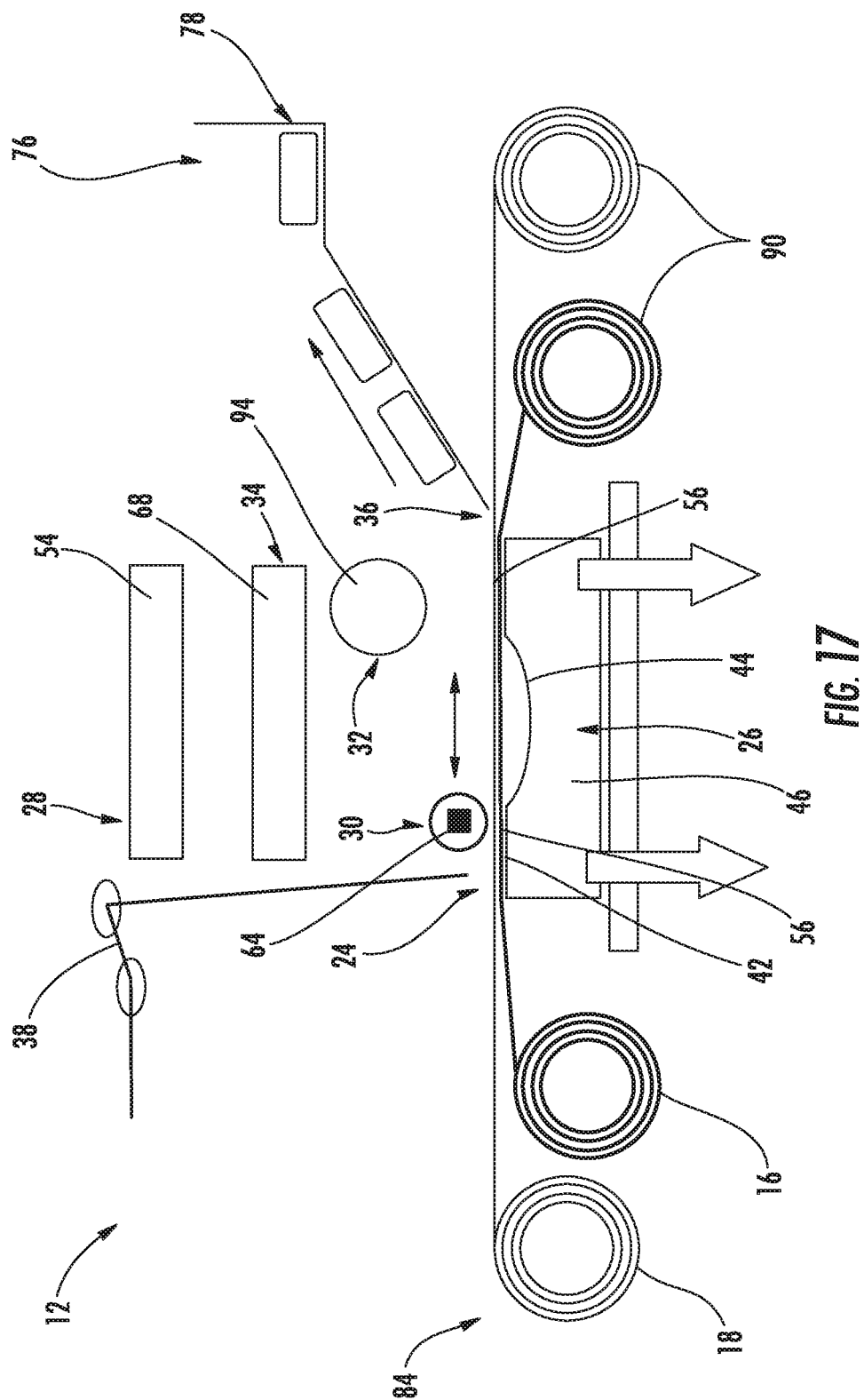
FIG. 17 is a schematic of components for performing steps of a two-dimensional vacuum forming process, according to certain embodiments of the present invention.
Figure 18:
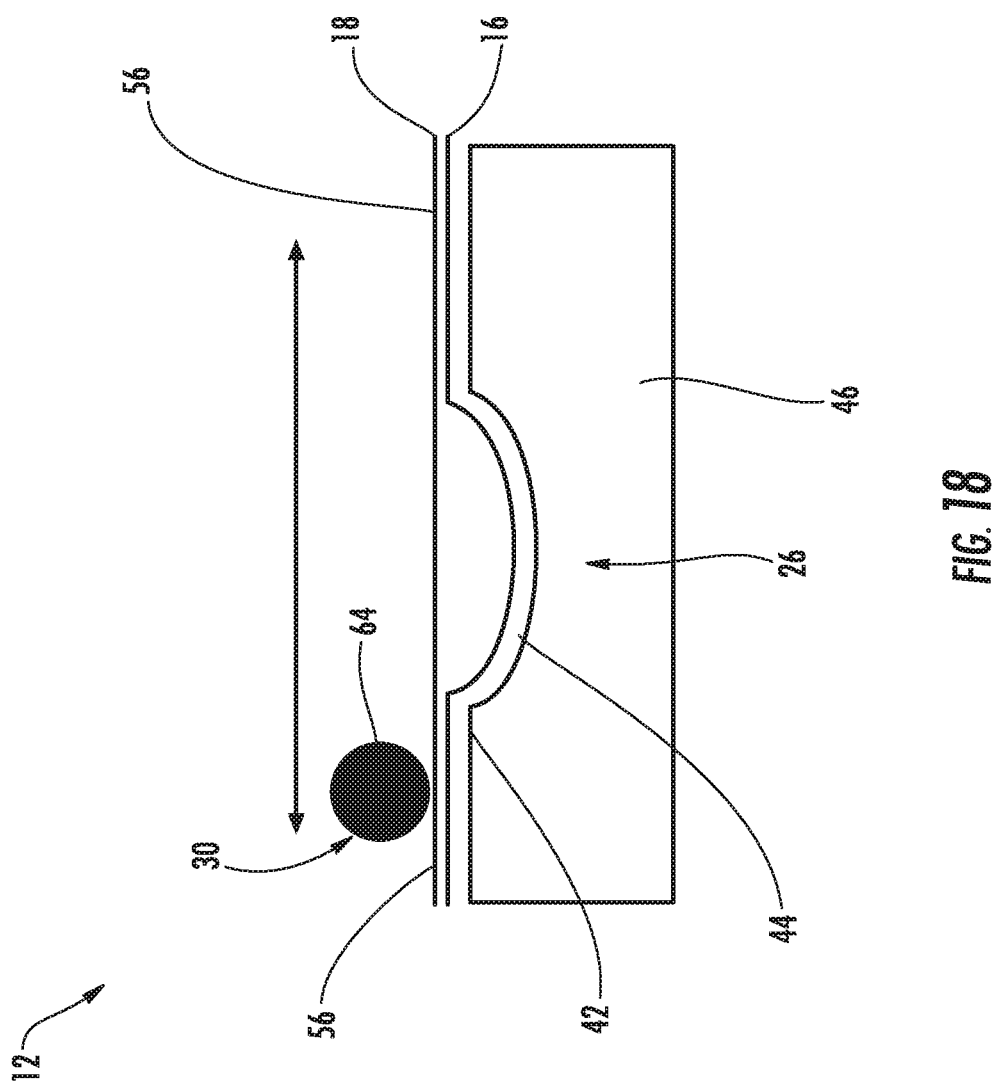
FIG. 18 is a schematic of components for performing vacuum forming and laminating steps of a two-dimensional vacuum forming process in combination with the other components of FIGS. 17, 19, and 20, according to certain embodiments of the present invention.

Before the cutting step 34 is performed, the molded material layers may require a cooling step 32, as best illustrated in FIGS. 17 and 19. The material layers may be cooled by any suitable cooling means, including but not limited to a flow of forced air across the surface (such as via a cooling fan 94), water mist, and/or a combination thereof.

Cutting Step

Once the laminating step 30 is complete, the bonded layers 16, 18 begin to cool and the cutting step 34 is performed. The heating element 54 and the roller 64 slide out of the way so that a laser or die cutting tool 68 mounted to the frame 58 supporting the vacuum table 46 may cut out the two-dimensional embossed article of wear 10 from the surrounding layers 16, 18.

Separating Step

In certain embodiments, the cutout articles of wear 10 are separated from the surrounding material layers via the separating step 36. The separating step 36 may be performed by a retrieval device 70, which may be slidingly mounted to the frame 58 supporting the vacuum table 46. The retrieval device 70 may comprise a plurality of telescoping arms 72 to which suction cups 74 are attached. Once the cutting step 34 is complete, the retrieval device 70 slides into place above the vacuum table 46. The arms 72 are positioned on the retrieval device 70 in locations that correspond to the locations of the two-dimensional embossed articles of wear 10 that have been cut away from the surrounding material layers. When the retrieval device 70 is in position above the vacuum table 46, the arms 72 extend until the suction cups 74 attach to the articles of wear 10. The arms 72 then retract, which separates the articles of wear 10 from the surrounding material layers. For part separation/removal, a mechanical arm or belt system incorporating suction bellows may also be employed. Other machines might employ static electric forces, magnetic forces, tacky surfaces (similar to the tacky surfaces on repositionable notes), micro bonding, hook and loop designs, or other similar designs.

Once the retrieval device 70 has retrieved the articles of wear 10, the retrieval device 70 slides away from the vacuum table 46 and over a collection area 76, where the suction cups 74 then release the articles of wear 10 so that they are collected in a collection device 78, which may be a stationary bin or a conveyor or other device that transports the articles of wear 10 to another suitable location.

Articles of Wear Formed by the Two-Dimensional Vacuum Forming Process

FIGS. 1, 4-6, 8, 10, 12, 14, and 15 illustrate various embodiments of articles of wear 10 formed via the two-dimensional vacuum forming process 12. In certain embodiments, the article of wear 10 may be an upper for a sports shoe, as shown in FIGS. 4-6, 8, 10, 12, and 14. In these embodiments, the article of wear 10 may be designed so that the second material layer 18 is facing the wearer's foot, but may also be used in reverse so that the first material layer 18 is facing the wearer's foot. In these embodiments, the article of wear 10 is formed with an generally flat shape with three-dimensional features molded into the first material layer 16. As shown in FIGS. 1, 4-6, 8, and 10, the three-dimensional features include but are not limited to embossing, de-bossing, and/or texture features. As shown in FIGS. 4-6, 8, 10, 12, 14, and 15, the article of wear 10 may also comprise liner assemblies, perimeter cutting, and/or perforations.

In other embodiments, the article of wear 10 may be a vacuum formed base plate or formed plate 80, which is designed to replace a strobel or board lasting plates in conventional shoe designs. As may be seen in FIG. 15, the plate 80 comprises air pockets 82 sandwiched between the first material layer 16 and the second material layer 18 covering the air pockets 82. This design provides additional cushioning, wicking, and breathability to a wearer's foot when the plate 80 is arranged so that the second material layer 18 is facing the wearer's foot. In other embodiments, the plate 80 provides additional cushioning and a waterproof upper when the plate 80 is arranged so that the first material layer 16 is facing the wearer's foot.

The plate 80 may also be assembled to an upper in a fast and cost-efficient manner. In certain embodiments, the upper is adhered or bonded to the sides of the plate 80 via a wheel that moves along the side to join the upper to the sides of the plate 80.

Three-Dimensional Vacuum Forming Process

FIGS. 28-37 illustrate various embodiments of articles of wear 10 formed via the three-dimensional vacuum forming process 14. In particular, the same machinery and process steps described above may be used with the three-dimensional vacuum forming process 14, with the following differences.

Differences Between Three-Dimensional and Two-Dimensional Vacuum Forming

Figure 30:
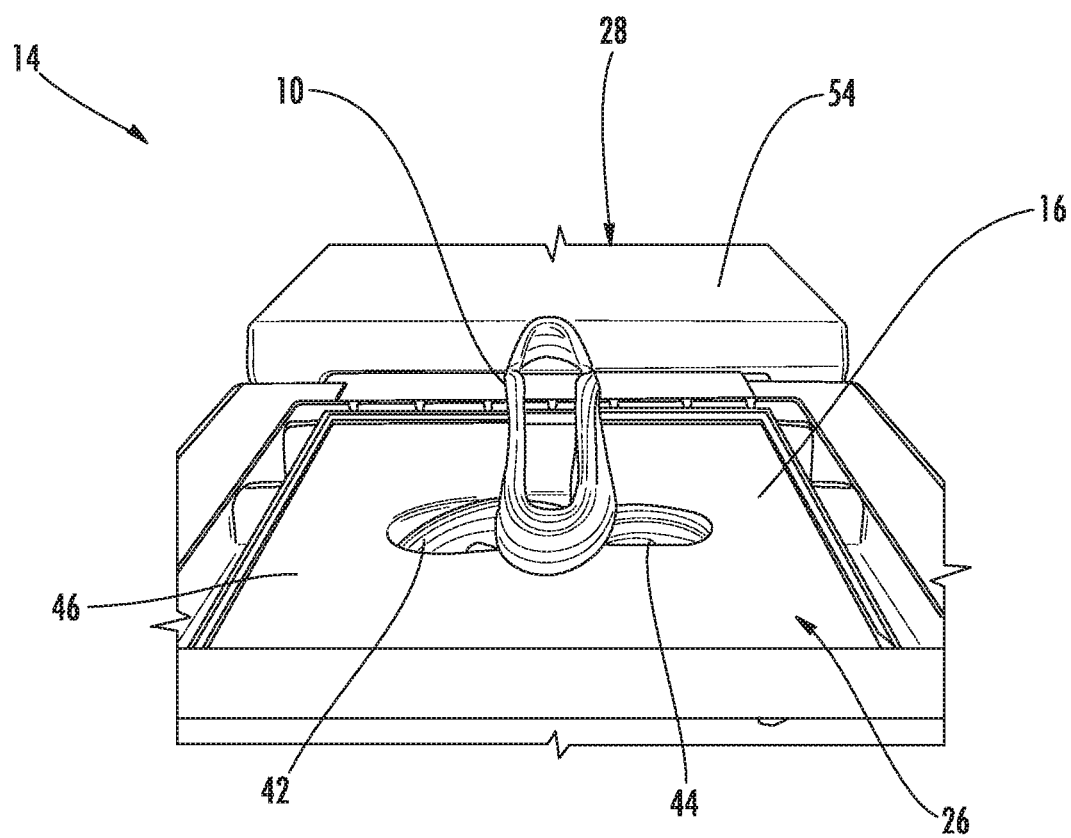
FIG. 30 is a partial perspective view of components for performing vacuum forming and laminating steps of a three-dimensional vacuum forming process in combination with the other components of FIGS. 19 and 20, according to certain embodiments of the present invention.
Figure 31:
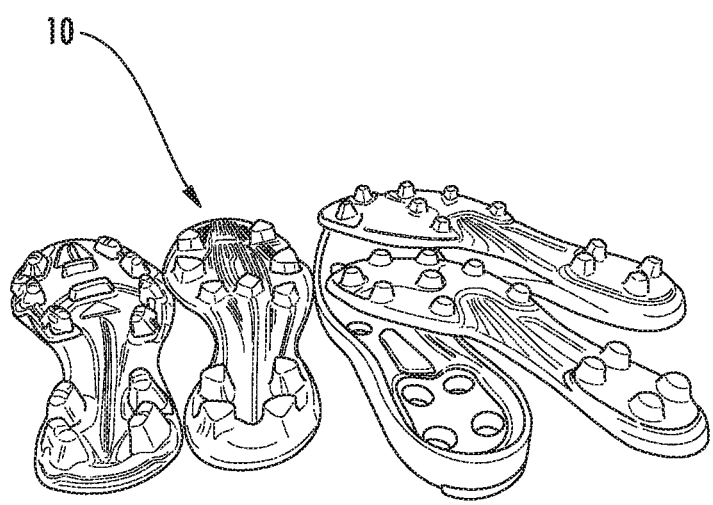
FIG. 31 is a perspective view of a plurality of articles of wear formed by a three-dimensional vacuum forming process, according to certain embodiments of the present invention.
Figure 32:
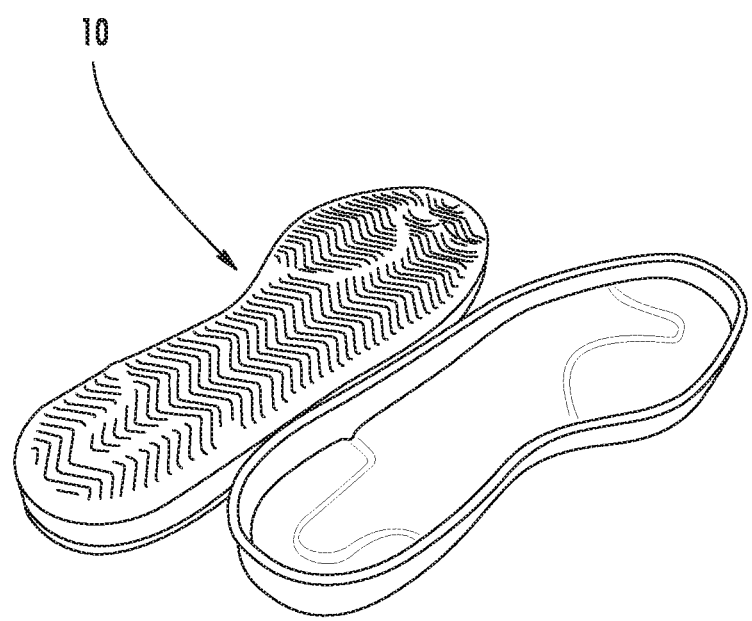
FIG. 32 is a perspective view of a plurality of articles of wear formed by a three-dimensional vacuum forming process, according to certain embodiments of the present invention.
Figure 33:
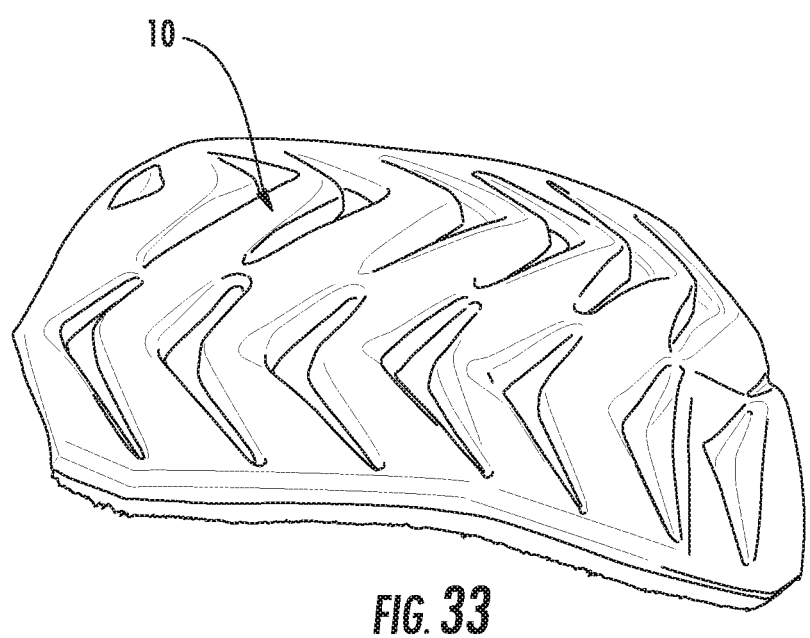
FIG. 33 is a perspective view of an article of wear formed by a three-dimensional vacuum forming process, according to certain embodiments of the present invention.
Figure 34:
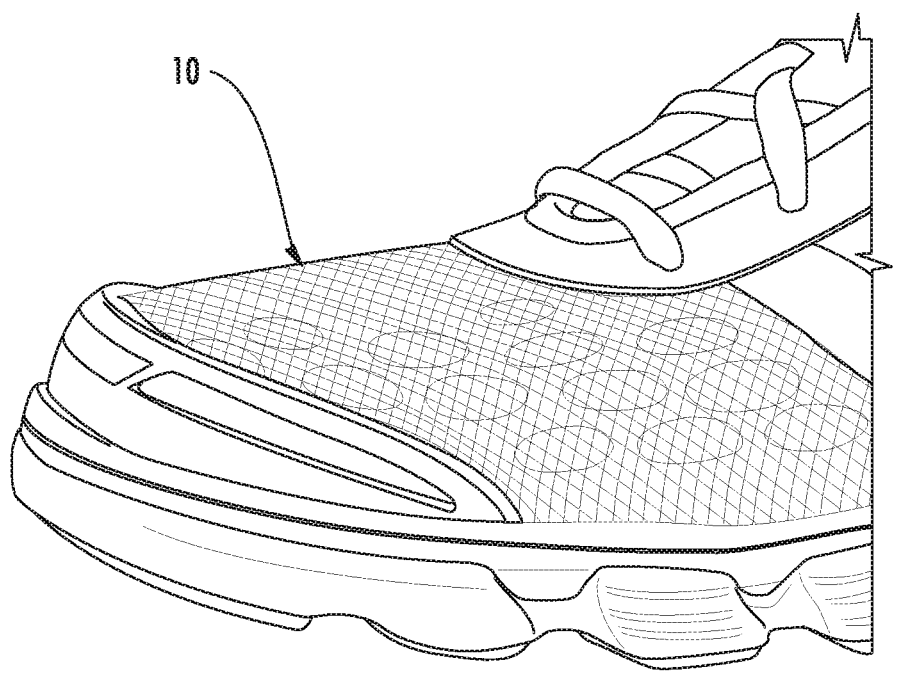
FIG. 34 is a partial perspective view of an article of wear formed by a three-dimensional vacuum forming process, according to certain embodiments of the present invention.
Figure 35:
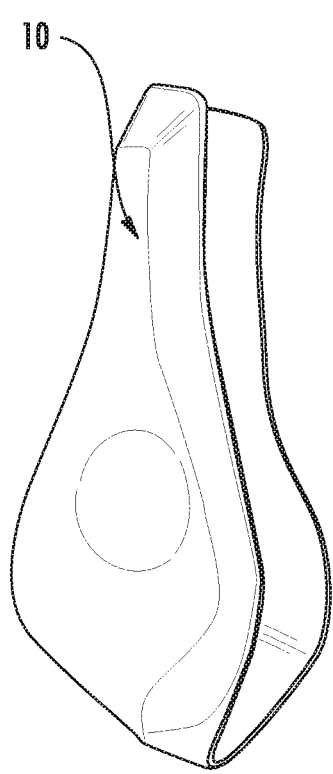
FIG. 35 is a perspective view of an article of wear formed by a three-dimensional vacuum forming process, according to certain embodiments of the present invention.
Figure 36:
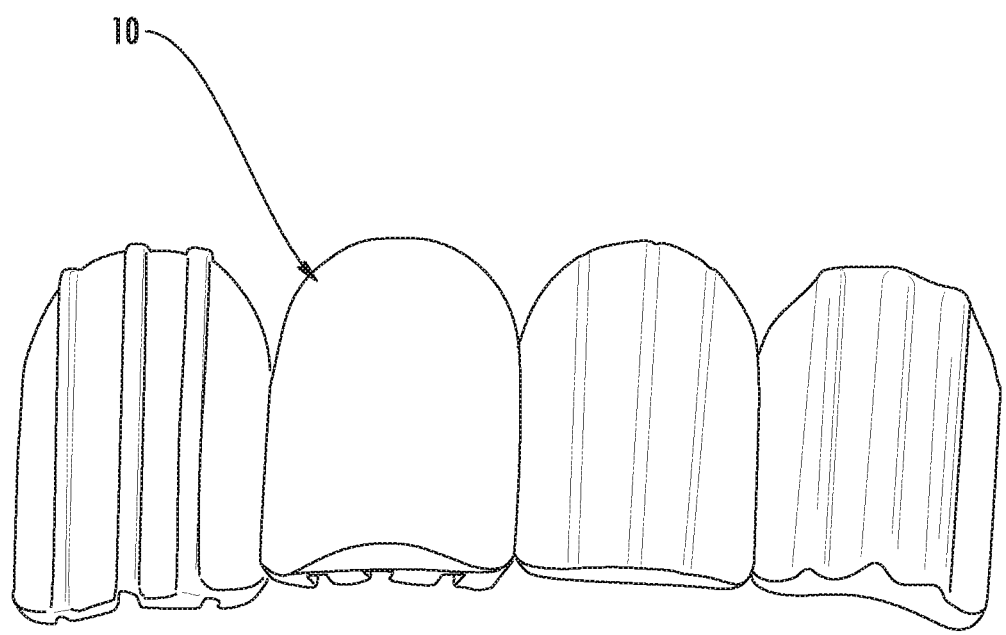
FIG. 36 is a perspective view of a plurality of articles of wear formed by a three-dimensional vacuum forming process, according to certain embodiments of the present invention.
Figure 37:
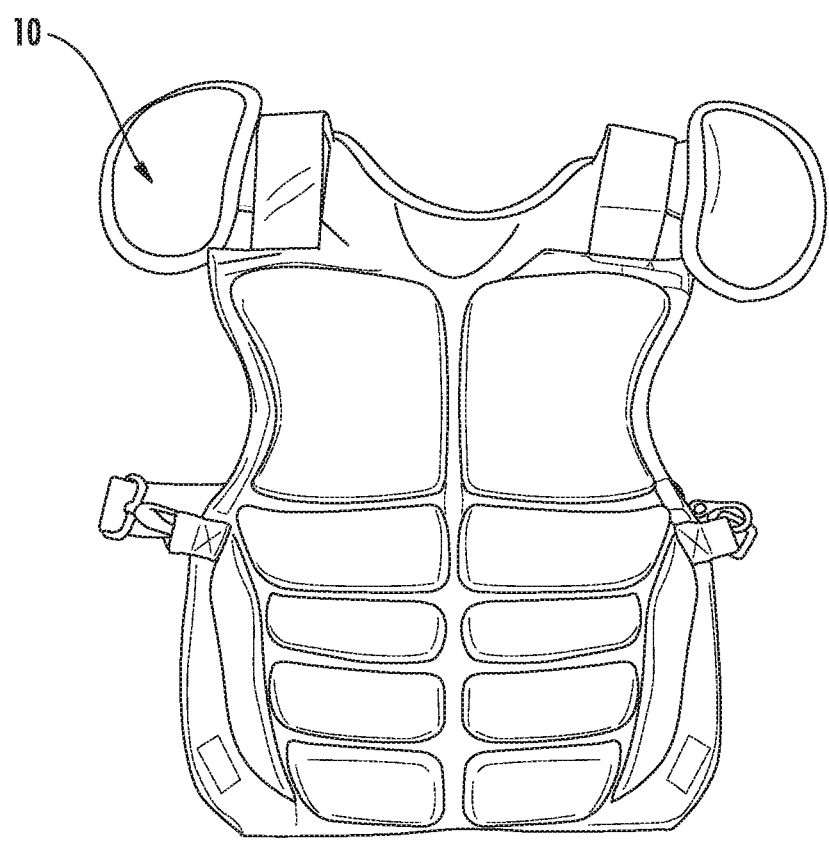
FIG. 37 is a perspective view of an article of wear formed by a three-dimensional vacuum forming process, according to certain embodiments of the present invention.

The primary difference between the two processes is the type of mold utilized. For three-dimensional vacuum forming, as best illustrated in FIG. 30, the mold may be shaped as a last or a deep draw cavity, among other shapes, whereas for the two-dimensional vacuum forming, the molds are relatively flat, with a height generally of up to 10 mm. For certain embodiments, the height of the mold may exceed 10 mm.

In certain embodiments of three-dimensional vacuum forming, the second material layer 18 may be positioned between the first material layer 16 and another non-breathable material layer 20 so that the second material layer 18 is also drawn into the cut-out locations 44 of the mold 42 during the vacuum forming step 26. By also molding the second material layer 18, a three dimensional article of wear 10 may be formed.

In the pre-heating step 24, all of the material layers may be fed through the pre-heating step so that the additional non-breathable material layer 20 is conditioned for molding to the mold 42 in the vacuum forming step. Like the two-dimensional vacuum forming process 12, the material layers are not adhered to one another when entering the vacuum forming step 26. Rather, the material layers are adjacent one another so that they can slide against each other when molding due to differences in the stretch rates among the materials.

In the vacuum forming step 26, to achieve a three dimensional article of wear 10, differently shaped molds 42 may be used in the vacuum, as shown in FIG. 30, and the level of vacuum required may differ from the level required for the two-dimensional vacuum forming process 12.

The laminating step 30 may be eliminated because the materials are bonded to one another within the mold 42, as opposed to using the roller 64 to join the areas of the material layers that are not drawn into the cut-out locations 44 of the mold 42.

The separating step 36 may require different equipment than the retrieval device 70 as the suction cups 74 may not be configured to readily attach to the three dimensional shape of the articles of wear 10. For part separation/removal, a mechanical arm or belt system incorporating suction bellows may also be employed. Other machines might employ static electric forces, magnetic forces, tacky surfaces (similar to the tacky surfaces on repositionable notes), micro bonding, hook and loop designs, or other similar designs.

Articles of Wear Formed by the Three-Dimensional Vacuum Forming Process

Examples of article of wear 10 formed with the three-dimensional vacuum forming process 14 are shown in FIGS. 28-37. As shown in FIGS. 28-29 and 31-37, these examples include but are not limited to three-dimensional uppers that are formed simultaneously with embossing, de-bossing, texture features, liner assembly, perimeter cutting and/or perforations, cleated plates for football and soccer, outsoles for performance oriented and classic shoes, mid-soles for performance oriented and classic shoes, profiled sock liners, protection pads for football and baseball, internal profile features in the upper to improve fit/comfort/wicking/etc., heel pads for gymnasts, improved comfort and fit ambidextrous soccer shin guards, and/or chest protectors. In certain embodiments, a midsole may be formed of outsole grade EVA so that the midsole may function as both an outsole and a midsole.

Figure 2:
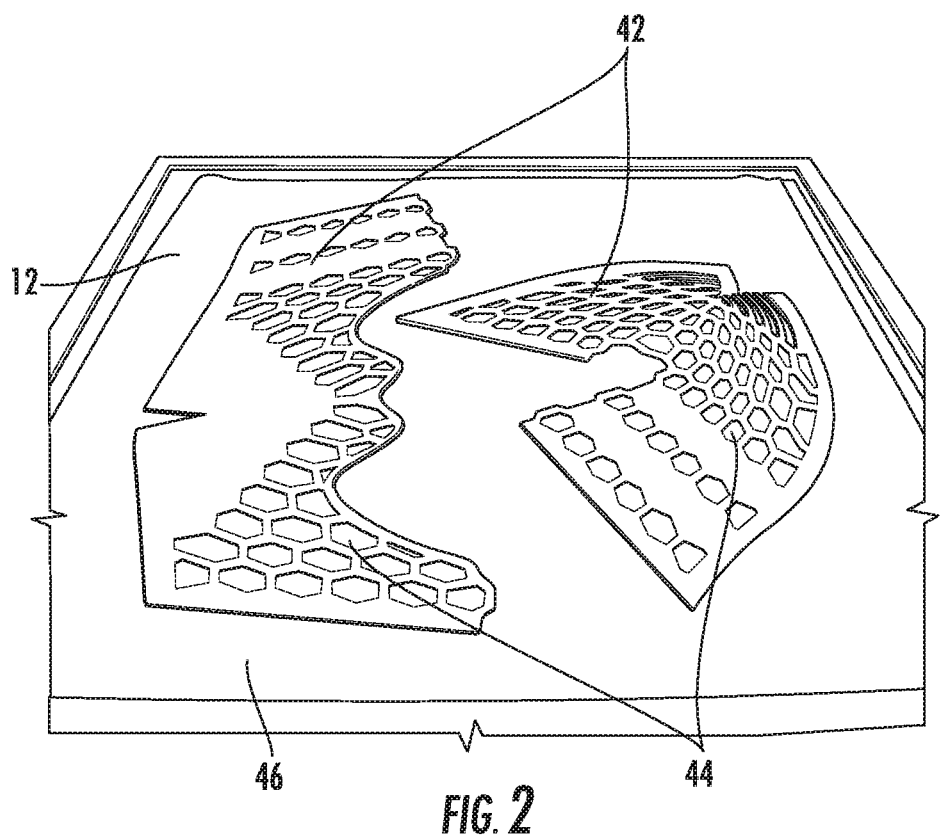
FIG. 2 is a perspective view of a pair of one-sided molds on a vacuum table for use with a two-dimensional vacuum forming process, according to certain embodiments of the present invention.
Figure 3:
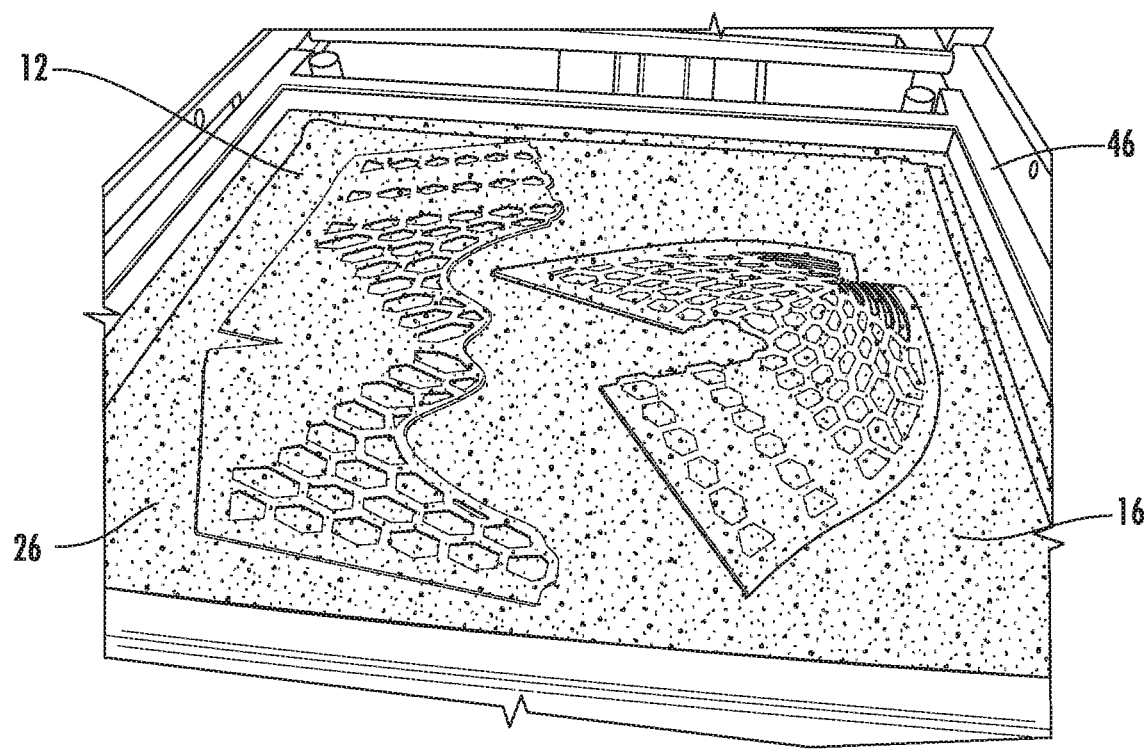
FIG. 3 is a perspective view of a first material layer being vacuum formed over the pair of one-sided molds by the vacuum table of FIG. 2, according to certain embodiments of the present invention.
Figure 4:
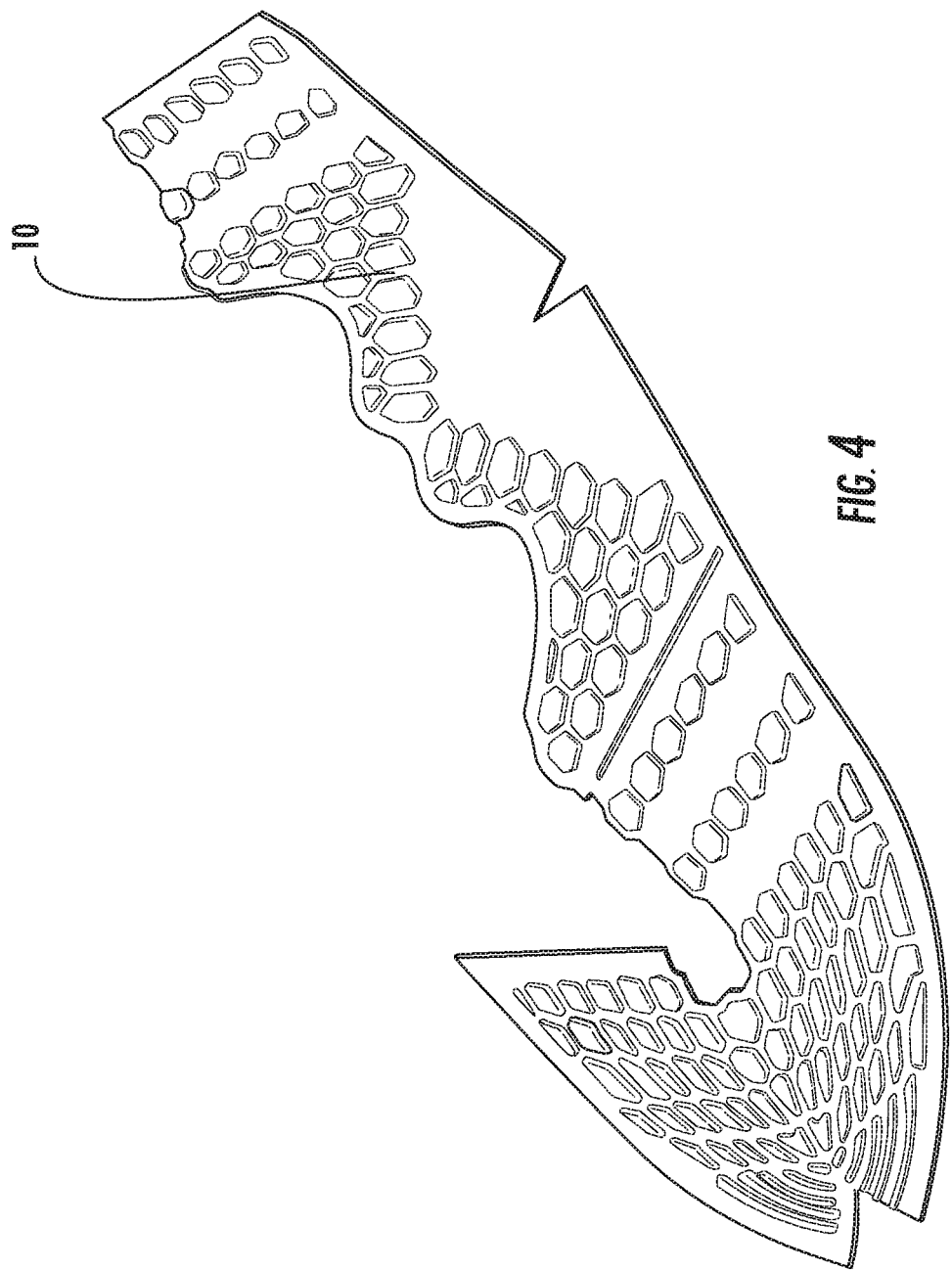
FIG. 4 is a top view of an article of wear that is cut and separated from a second material layer laminated to the vacuum-formed first material layer of FIG. 3, according to certain embodiments of the present invention.
Figure 5:
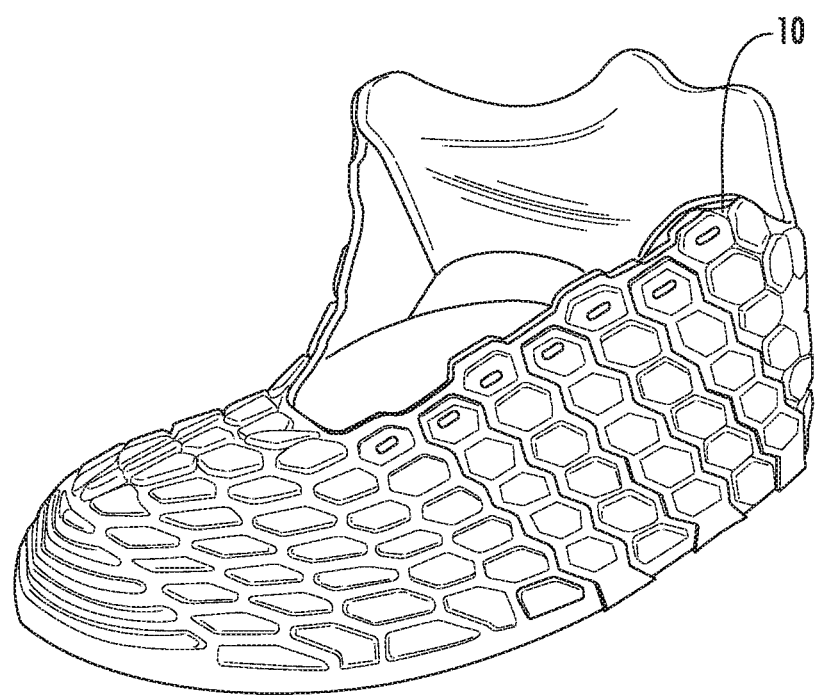
FIG. 5 is a perspective view of a three-dimensional upper formed from the two-dimensional article of wear of FIG. 4.
Figure 6:
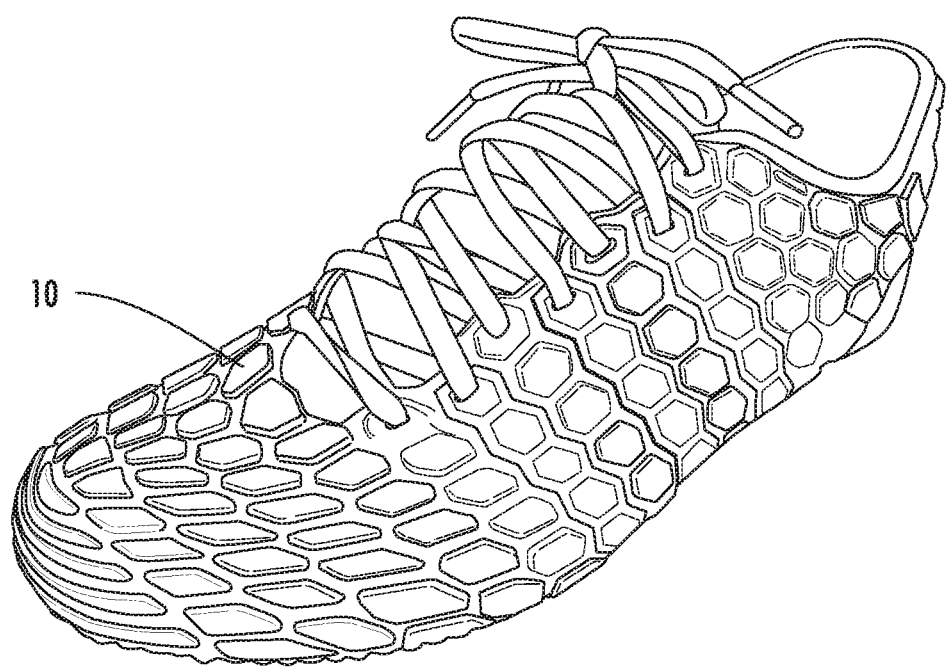
FIG. 6 is a perspective view of a shoe formed from the three-dimensional upper of FIG. 5.
Figure 7:
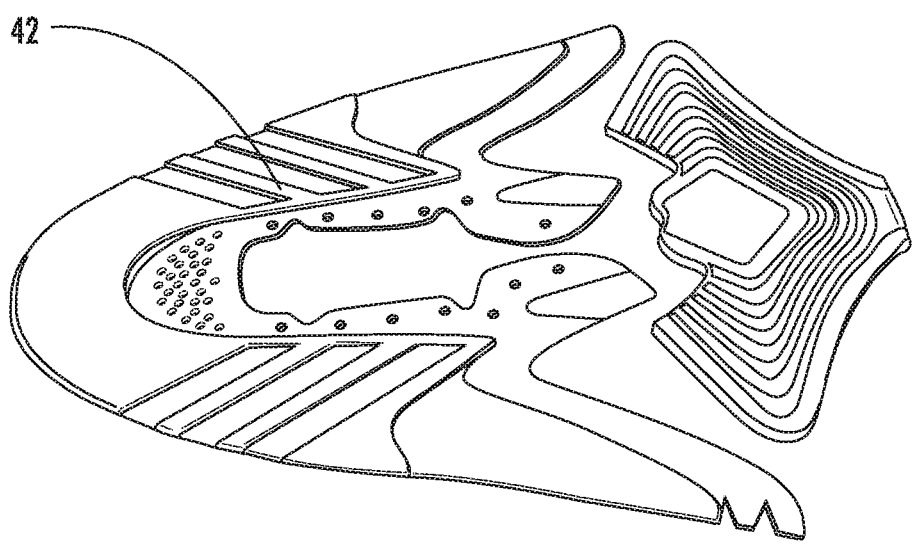
FIG. 7 is a top view of a one-sided mold for use with a two-dimensional vacuum forming process, according to certain embodiments of the present invention.

Material Supply For Two-Dimensional and Three-Dimensional Vacuum Forming Processes In certain embodiments, as shown in FIGS. 17-27, the two-dimensional vacuum forming process 12 and/or the three-dimensional vacuum forming process 14 may be automated so that the layers 16, 18 are pulled through a continuous or semi-continuous process, as opposed to a batch process, as shown in FIGS. 2-3. In these embodiments, a material supply stand 84 may be positioned upstream of the pre-heating step 24. As shown in FIGS. 17, 19, and 20-21, at least one roll of material layers may be mounted on the material supply stand 84. In some embodiments, the material is fed through a pair of push rollers 86 prior to entering the pre-heating step 24. In other embodiments, as shown in FIGS. 20-21, the first material layer 16 is fed directly into the pre-heating step 24, while the second material layer 18 by-passes the pre-heating step 24, and the layers 16, 18 are fed through the pair of push rollers 86 positioned after the pre-heating step 24. A person of ordinary skill in the art will understand that the material layers 16, 18 may be transported from the material supply stand 84 through the two-dimensional vacuum forming process 12 using any suitable device, including but not limited to push rollers, pull rollers, moving pinchers, or any suitable combination thereof.

Furthermore, in certain embodiments, the material supply stand 84 is configured to releasably couple and de-couple from the rest of the process so that the material can be easily exchanged as rolls are depleted.

In certain embodiments, as shown in FIG. 19, following the cutting step 34, the surrounding material layers 16, 18 from which the articles of wear 10 were removed may be fed through a pair of pull rollers 88 to assist with pulling the material layers 16, 18 through the process 12. These surrounding material layers 16, 18 may then be collected as scrap or waste by being re-wound into rolls 90 at the end of the process 12, as best illustrated in FIGS. 17, 20-21, and 27.

A person of ordinary skill in the art will understand that the material layers 16, 18 may be transported from the material supply stand 84 and through the two-dimensional vacuum forming process 12 using any suitable device, including but not limited to push rollers, pull rollers, moving pinchers, dual belt system, or any suitable combination thereof.

Advantages of Two-Dimensional and Three-Dimensional Vacuum Forming Over Conventional Manufacturing Methods Use of both the two-dimensional vacuum forming process 12 and the three-dimensional vacuum forming process 14 provide instantly perceived benefits over traditional manufacturing techniques. For example, both processes provide added design flexibility, wherein embossing, de-bossing, and various texture effects can be created in one pull. The processes also have high productivity, lower tooling costs, and an easier process than conventional manufacturing methods. For example, 1 machine as described above may produce 200-400 uppers per hour, and 1 operator may supervise multiple machines.

The processes also provide for a lighter shoe than conventional manufacturing methods. For example, a direct comparison of the same shoe formed through vacuum forming and conventional methods resulted in a shoe formed by vacuum forming that weighed 40% less than the same shoe formed through conventional methods.

Other Machine Designs

The vacuum processes may be used with any formable materials including but not limited to EVA, PU, thermoplastic polyurethane ("TPU"), synthetics, leather, nylon, polyester, pebax, polyamides (such as Rilsan®), and other foams, for single or multi-layer construction, etc.

Additional embodiments of the machinery include a two-dimensional vacuum forming machine for breathable materials utilizing a silicone skin for vacuum forming and bonding, wherein no pre-heating step is required.

Other embodiments of the machinery include a three-dimensional vacuum forming and compression molding machine.

In the following, further examples are described to facilitate the understanding of the invention:

1. A method of two-dimensionally forming an article of wear comprising:
   positioning a first side of a first material layer adjacent a one-sided mold comprising cut-out locations;
   positioning a second material layer adjacent a second side of the first material layer;
   applying a vacuum to the first side of the first material layer so that the first material layer is molded to the cut-out locations within the one-sided mold; and
   bonding the second material layer to the first material layer in areas outside the cut-out locations of the one-sided mold.
2. The method of example 1, wherein the method further comprises applying heat to the first material layer and the second material layer while applying the vacuum to the first side of the first material layer.
3. The method of any preceding example, wherein the method further comprises pre-heating at least the first material layer prior to positioning the first side of the first material layer adjacent the one-sided mold.
4. The method of any preceding example, wherein the method further comprises cutting the article of wear out of the first material layer and the second material layer.
5. The method of any preceding example, wherein the method further comprises separating the cut article of wear from the first material layer and the second material layer.
6. The method of any preceding example, wherein the first material layer is a non-breathable film, and the second material layer is a breathable material.
7. The method of any preceding example, wherein the article of wear comprises a formed plate having air pockets sandwiched between the first material layer and the second material layer.
8. The method of any preceding example, the method further comprising coupling sides of the formed plate to an upper so that the second material layer is facing a wearer's foot to provide breathability and wicking to the wearer's foot.
9. The method of any preceding example, the method further comprising coupling sides of the formed plate to an upper so that the first material layer is facing a wearer's foot to provide a waterproof upper.
10. The method of any preceding example, wherein applying the vacuum to the first side of the first material layer does not cause the second material layer to become molded to the cut-out locations within the one-sided mold.
11. The method of any preceding example, wherein the article of wear comprises a generally flat shape with three-dimensional features molded into the first material layer.
12. The method of any preceding example, wherein the three-dimensional features comprise one or more of embossing, de-bossing, and texture features.
13. A system for vacuum forming articles of wear comprising:
    a frame supporting a vacuum table comprising a one-sided mold;
    a seal frame coupled to the frame and positioned above the vacuum table, wherein the seal frame is configured to surround the one-sided mold; and
    a heating element slidingly coupled to the frame above the seal frame.
14. The system of example 13, further comprising a roller coupled to a pair of tracks positioned in opposing sides of the seal frame.
15. The system of example 13 or 14, further comprising one or more heating elements positioned adjacent the vacuum table.
16. The system of any of examples 13-15, further comprising a cutting tool mounted to the frame above the vacuum table.
17. The system of any of examples 13-16, further comprising a retrieval device slidingly coupled to the frame.
18. The system of example 17, further comprising a plurality of telescoping arms positioned on the retrieval device.
19. An article of wear comprising a generally flat shape formed by:
    a first material layer formed of non-breathable material, wherein the first material layer comprises three-dimensional features; and
    a second material layer formed of breathable material, wherein the second material layer forms a locking layer with the first material layer that maintains a shape of the three-dimensional features when the article of wear is transitioned from the generally flat shape to a three-dimensional structure.

20. The article of wear of example 19, wherein the second material layer maintains the shape of the three-dimensional features when the article of wear is transitioned from the generally flat shape to the three-dimensional structure by having a low amount of stretch or no stretch.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An article of footwear comprising:
    a first material layer having a first side and a second side; and
    a second material layer that is more breathable than the first material layer, the second material layer positioned adjacent the second side of the first material layer;
    wherein the first material layer comprises a plurality of molded cupped portions that extend in a direction of the first side;
    wherein the second material layer is directly bonded to the second side of the first material layer along at least a perimeter of each of the plurality of molded cupped portions to form a plurality of enclosures;
    wherein the plurality of enclosures are free of additional materials;
    wherein the plurality of enclosures are arranged to cover a majority of at least one of a heel region or a toe region of an upper of the article of footwear; and
    wherein the article of footwear further comprises a formed plate having the plurality of enclosures sandwiched between the first material layer and the second material layer.

2. The article of footwear of claim 1, wherein the first material layer comprises one or more three-dimensional features at least partially formed along the plurality of molded cupped portions and that comprise one or more of embossing, de-bossing, or texture features.

3. The article of footwear of claim 1, wherein the first material layer is formed of non-breathable material and the second material layer is formed of breathable material.

4. The article of footwear of claim 1, wherein the first material layer comprises a non-breathable film, a synthetic and/or natural leather, a non-breathable fabric, a non-breathable mesh, ethylene-vinyl acetate ("EVA"), polyurethane ("PU"), thermoplastic polyurethane ("TPU"), or a thermoplastic material.

5. The article of footwear of claim 1, wherein the second material layer comprises a breathable mesh, a breathable fabric, or a breathable material.

6. An article of footwear comprising:
    a first material layer having a first side and a second side; and
    a second material layer that is more breathable than the first material layer, the second material layer positioned adjacent the second side of the first material layer;
    wherein the first material layer comprises a plurality of molded cupped portions that extend in a direction of the first side;
    wherein the second material layer is bonded to the second side of the first material layer along at least a perimeter of each of the plurality of molded cupped portions to form a plurality of enclosures;
    wherein the plurality of enclosures are free of additional materials;
    wherein the plurality of enclosures are arranged to cover a majority of a sole portion of the article of footwear; and
    wherein the sole portion comprises a formed plate having the plurality of enclosures sandwiched between the first material layer and the second material layer.

7. The article of footwear of claim 6, wherein the first material layer is a non-breathable film, and the second material layer is a breathable material.

8. The article of footwear of claim 6, wherein the formed plate is arranged so that the second material layer is facing a wearer's foot to provide breathability and wicking to the wearer's foot.

9. The article of footwear of claim 6, wherein the formed plate is arranged so that the first material layer is facing a wearer's foot to provide a waterproof sole.

10. The article of footwear of claim 6, further comprising a third material layer comprising a heat activated adhesive layer by which the second material layer is bonded with the first material layer at at least the perimeter of each of the plurality of molded cupped portions; wherein the heat activated adhesive layer is directly bonded to the second material layer and is directly bonded to the first material layer.

11. The article of footwear of claim 10, further comprising a fourth material layer comprising a stretchable fabric, a sandwich mesh, a woven material, or a non-woven material and positioned between the first material layer and the second material layer, below the first material layer, or above the second material layer.

12. The article of footwear of claim 6, further comprising three-dimensional features molded into the first material layer.

13. An article of footwear comprising:
    a first material layer having a first side and a second side; and
    a second material layer that is more breathable than the first material layer, the second material layer positioned adjacent the second side of the first material layer;
    wherein the first material layer comprises a plurality of molded cupped portions that extend in a direction of the first side;
    wherein the second material layer is bonded to the second side of the first material layer along at least a perimeter of each of the plurality of molded cupped portions to form a plurality of enclosures;
    wherein the plurality of enclosures are free of additional materials;
    wherein the plurality of enclosures are arranged to cover a majority of at least one of a medial region or a lateral region of an upper of the article of footwear; and
    wherein the article of footwear further comprises a formed plate having the plurality of enclosures sandwiched between the first material layer and the second material layer.

14. The article of footwear of claim 13, wherein at least one of the first material layer or the second material layer comprises edges that extend outwardly beyond the bonded perimeter of each of the plurality of molded cupped portions.

15. The article of footwear of claim 13, wherein the first material layer comprises a thermoplastic polyurethane ("TPU") and the second material layer comprises ethylene-vinyl acetate ("EVA").

16. The article of footwear of claim 13, wherein the second material layer is bonded with the second side of the first material layer so as to form a locking layer that maintains a shape of each of the plurality of molded cupped portions by maintaining at least a portion of each of the plurality of molded cupped portions at least partially displaced away from the second material layer.

17. The article of footwear of claim 16, wherein the locking layer maintains the shape of each of the plurality of molded cupped portions by a tension created in the first material layer in a process of at least one of vacuum forming and laminating the first material layer with the second material layer.

18. The article of footwear of claim 16, wherein the second material layer is bonded with the second side of the first material layer to form the locking layer by:
    the second material layer being directly bonded with the second side of the first material layer; or
    the second material layer being directly bonded to a heat activated adhesive layer that is also directly bonded with the second side of the first material layer.

\* \* \* \* \*